United States Patent
Kim et al.

(10) Patent No.: US 10,469,134 B2
(45) Date of Patent: Nov. 5, 2019

(54) FEEDBACK METHOD AND APPARATUS FOR COOPERATIVE MULTI-POINT COMMUNICATION IN COMMUNICATION SYSTEM

(71) Applicant: Samsung Electronics Co., Ltd., Gyeonggi-do (KR)

(72) Inventors: Ki-Il Kim, Gyeonggi-do (KR); Hyo-Jin Lee, Seoul (KR); Youn-Sun Kim, Gyeonggi-do (KR); Young-Bum Kim, Seoul (KR); Hyoung-Ju Ji, Seoul (KR); Seung-Hoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 859 days.

(21) Appl. No.: 13/665,581

(22) Filed: Oct. 31, 2012

(65) Prior Publication Data

US 2013/0107832 A1    May 2, 2013

Related U.S. Application Data

(60) Provisional application No. 61/553,494, filed on Oct. 31, 2011, provisional application No. 61/651,829, (Continued)

(51) Int. Cl.
*H04L 5/00*    (2006.01)
*H04B 7/024*    (2017.01)

(52) U.S. Cl.
CPC .......... *H04B 7/024* (2013.01); *H04L 5/0035* (2013.01); *H04L 5/0057* (2013.01)

(58) Field of Classification Search
None
See application file for complete search history.

(56) References Cited

U.S. PATENT DOCUMENTS

| | | | |
|---|---|---|---|
| 2004/0013089 A1 | 1/2004 | Taneja et al. | |
| 2010/0085917 A1* | 4/2010 | Gorokhov et al. | 370/328 |

(Continued)

FOREIGN PATENT DOCUMENTS

| | | |
|---|---|---|
| CA | 2 793 084 | 9/2011 |
| EP | 2 337 413 | 6/2011 |

(Continued)

OTHER PUBLICATIONS

Samsung, "Miscellaneous Corrections", R1-111446, 3GPP TSG-RAN WG1 #65, May 9-13, 2011, 77 pages.

(Continued)

*Primary Examiner* — Angel T Brockman
(74) *Attorney, Agent, or Firm* — The Farrell Law Firm, P.C.

(57) ABSTRACT

A feedback method and apparatus are provided for Cooperative Multi-Point (CoMP) communication in a communication system. The method includes checking a number of feedback allocations configured by Radio Resource Control (RRC) signaling, determining a number of bits of an aperiodic feedback indicator based on the checked number of feedback allocations, receiving Downlink Control Information (DCI) including the aperiodic feedback indicator, interpreting the aperiodic feedback indicator, based on the determined number of bits of the aperiodic feedback indicator, and performing aperiodic feedback of at least one feedback allocation, based on the aperiodic feedback indicator.

20 Claims, 12 Drawing Sheets

Related U.S. Application Data filed on May 25, 2012, provisional application No. 61/665,491, filed on Jun. 28, 2012.

(56) References Cited

U.S. PATENT DOCUMENTS

| | | | |
|---|---|---|---|
| 2010/0098012 A1 | 4/2010 | Bala et al. | |
| 2010/0216469 A1 | 8/2010 | Yi et al. | |
| 2010/0238824 A1* | 9/2010 | Farajidana | H04B 7/0417 370/252 |
| 2010/0278109 A1* | 11/2010 | Papasakellariou et al. | 370/328 |
| 2011/0069637 A1* | 3/2011 | Liu et al. | 370/254 |
| 2011/0103247 A1* | 5/2011 | Chen et al. | 370/252 |
| 2011/0105162 A1* | 5/2011 | Kim | H04L 1/001 455/500 |
| 2011/0188462 A1 | 8/2011 | Yoo et al. | |
| 2011/0199944 A1 | 8/2011 | Chen et al. | |
| 2011/0243079 A1 | 10/2011 | Chen et al. | |
| 2011/0249582 A1 | 10/2011 | Choi et al. | |
| 2011/0299484 A1* | 12/2011 | Nam | H04L 1/0025 370/329 |
| 2013/0088986 A1* | 4/2013 | Xiao | H04W 72/0426 370/252 |
| 2014/0036796 A1* | 2/2014 | Etemad | H04W 24/02 370/329 |

FOREIGN PATENT DOCUMENTS

| | | |
|---|---|---|
| EP | 2 375 619 | 10/2011 |
| EP | 2 582 084 | 4/2013 |
| RU | 2 364 039 | 8/2009 |
| WO | WO 2011/034321 | 3/2011 |
| WO | WO 2011/040751 | 4/2011 |
| WO | WO 2011/085230 | 7/2011 |
| WO | WO 2011/088403 | 7/2011 |
| WO | WO 2011/094650 | 8/2011 |
| WO | WO 2011/100466 | 8/2011 |
| WO | WO 2011/127092 | 10/2011 |
| WO | WO2012/023007 * | 2/2012 ............ H04W 72/14 |

OTHER PUBLICATIONS

European Search Report dated Aug. 13, 2015 issued in counterpart application No. 15168035.2-1854, 8 pages.

European Search Report dated Sep. 18, 2015 issued in counterpart application No. 12190759.6-1854, 6 pages.

Panasonic, "Uplink Signalling for Carrier Aggregation Enhancement", R1-113115, 3GPP TSG-RAN WG1 Meeting #66bis, Oct. 10, 2011.

Texas Instruments: "On Proposed Enhancements to Periodic CSI Reporting", 3GPP TSG RAN WG1 #66bis, R1-113241, Oct. 4, 2011.

Mediatek Inc: "Discussion on Rel-10 LTE Feature List and UE Capability from RAN1 Perspective", 3GPP TSG-RAN WG1 #63bis, R1-110145, Jan. 12, 2011.

Qualcomm Incorporated, "Clarification of Ambiguous DCI Formats 0 and 1A", R1-112533, 3GPP TSG-RAN WG1 #66, Aug. 22-26, 2011, 5 pages.

Texas Instruments, "CSI Feedback for DL CoMP, R1-113249", 3GPP TSG RAN WG1 Meeting #66bis, Oct. 10-14, 2011, 3 pages.

Russian Office Action dated Jul. 4, 2016 issued in counterpart application No. 2014122142/07, 15 pages.

Chinese Office Action dated Jul. 4, 2016 issued in counterpart application No. 201280061340.4, 17 pages.

Japanese Office Action dated Jun. 6, 2016 issued in counterpart application No. 2014-539869, 6 pages.

Motorola Mobility, "Discussion on UE Demodulation and CSI Requirements in CA", R4-110656, 3GPP TSG-RAN WG4 Meeting #58, Feb. 21-25, 2011, 4 pages.

Japanese Notice of Allowance dated Apr. 10, 2017 issued in counterpart application No. 2014-539869, 8 pages.

Panasonic, "Standardization Impact of DL Multi-Antenna Operation", R1-100376, 3GPP TSG RAN WG1 Meeting #59b, Jan. 18-22, 2010, 3 pages.

European Search Report dated Oct. 24, 2017 issued in counterpart application No. 17186199.0-1854, 8 pages.

* cited by examiner

FEEDBACK METHOD AND APPARATUS FOR COOPERATIVE MULTI-POINT COMMUNICATION IN COMMUNICATION SYSTEM

PRIORITY

This application claims priority under 35 U.S.C. § 119(a) to U.S. Provisional Patent Application Ser. No. 61/553,494, which was filed in the United States Patent and Trademark Office (USPTO) on Oct. 31, 2011, U.S. Provisional Patent Application Ser. No. 61/651,829, which was filed in the USPTO on May 25, 2012, and U.S. Provisional Patent Application Ser. No. 61/665,491, which was filed in the USPTO on Jun. 28, 2012, the entire disclosure of each of which is hereby incorporated by reference.

BACKGROUND OF THE INVENTION

1. Field of the Invention

The present invention relates to a cellular mobile communication system, and more particularly, to a method and apparatus for generating a feedback signal to support downlink transmission of a User Equipment (UE) by a plurality of Base Stations (BSs) (or Node Bs).

2. Description of the Related Art

From an early stage of providing only voice-oriented services, mobile communication systems have evolved into high-speed and high-quality wireless packet data communication systems, which provide data and multimedia services. Recently, various mobile communication standards, e.g., High Speed Downlink Packet Access (HSDPA) of the 3rd Generation Partnership Project (3GPP), High Speed Uplink Packet Access (HSUPA), Long Term Evolution (LTE), Long Term Evolution Advanced (LTE-A), High Rate Packet Data (HRPD) of the 3GPP2, 802.16 of the Institution of Electrical and Electronics Engineers (IEEE), etc., have been developed to support high-speed and high-quality wireless packet data transmission services.

The LTE system was developed for efficiently supporting high-speed wireless packet data transmission and maximizes wireless system capacity by using various wireless connection techniques. The LTE-A system, i.e., a wireless system advanced from the LTE system, has improved data transmission capability when compared to the LTE system.

Existing $3^{rd}$-Generation wireless packet data communication systems, e.g., HSDPA, HSUPA, HRPD, etc., use an Adaptive Modulation and Coding (AMC) scheme and a channel-sensitive scheduling scheme to improve transmission efficiency. When using the AMC scheme, a transmitter may adjust the amount of data to be transmitted according to a channel state. AMC and channel-sensitive scheduling apply suitable modulation and coding at the most efficient time determined based on partial channel information fed back from a receiver.

In an AMC-applied wireless packet data communication system, a transmitter may adjust the amount of transmission data according to a channel state. For example, in poor channel states, the transmitter may reduce the amount of transmission data to adjust a reception error probability to a desired level, and in a good channel states, the transmitter may increase the amount of transmission data to adjust a reception error probability to a desired level and efficiently transmit a large amount of information.

In a wireless packet data transmission system to which channel-sensitive scheduling resource management is applied, the transmitter selectively services a user having a superior channel state among several users, thereby contributing to an increase in the system capacity, as compared to when the transmitter merely allocates a channel to one user and then services the corresponding user. Such an increase in system capacity is referred to as "multi-user diversity gain".

AMC, when used together with a Multiple Input Multiple Output (MIMO) transmission scheme, may determine the number of spatial layers or a rank for a transmission signal. In this case, the AMC-applied wireless packet data communication system, when determining an optimal data rate, considers a code rate, a modulation scheme, and the number of layers through which the signal is to be transmitted using MIMO.

Basically, a cellular mobile communication system is formed by establishing a plurality of cells in a limited region. In each cell, a Node B equipment provides a mobile communication service to UEs in the cell. When a mobile communication service is independently provided cell-by-cell, a Reference Signal (RS) for channel estimation is transmitted for UEs in each cell to measure a DownLink (DL) channel state for each cell.

In a 3GPP LTE-A system, a UE measures a channel state between a Node B and itself by using a Channel Status Information Reference Signal (CSI-RS) transmitted from the Node B.

However, a conventional feedback technique only considers only a CSI feedback of a single Node B, i.e., a single transmission point, transmitted to a particular UE.

In a cellular mobile communication system, for a UE located at a cell edge, adjacent cells cooperate with each other for data transmission through Cooperative Multi-Point (CoMP) transmission, also referred to as "CoMP" for simplicity. Therefore, in CoMP transmission, considering simultaneous transmissions from various transmission points, a technique for multiple CSI feedbacks is required.

SUMMARY OF THE INVENTION

The present invention is designed to address the above-described problems and shortcomings in the conventional art and to provide at least the advantages described below.

Accordingly, an aspect of the present invention is to provide a effective method for generating feedback using CoMP transmission in a wireless communication system.

Another aspect of the present invention is to provide an apparatus for effectively generating feedback using CoMP transmission in a wireless communication system.

Another aspect of the present invention is to provide a detailed feedback method and apparatus in a multiple CSI feedback scenario.

In accordance with an aspect of the present invention, a feedback method is provided for CoMP communication in a communication system. The feedback method includes checking a number of feedback allocations configured by Radio Resource Control (RRC) signaling, determining a number of bits of an aperiodic feedback indicator based on the checked number of feedback allocations, receiving Downlink Control Information (DCI) including the aperiodic feedback indicator, interpreting the aperiodic feedback indicator, based on the determined number of bits of the aperiodic feedback indicator, and performing aperiodic feedback of at least one feedback allocation, based on the aperiodic feedback indicator.

In accordance with another aspect of the present invention, a feedback method is provided for CoMP communication in a communication system. The feedback method includes checking a number of feedback allocations configured by Radio Resource Control (RRC) signaling, determining a number of bits of an aperiodic feedback indicator, based on the checked number of feedback allocations, transmitting, to a User Equipment (UE), Downlink Control Information (DCI) including the aperiodic feedback indicator generated by the determined number of bits, and receiving, from the UE, at least one aperiodic feedback, based on the aperiodic feedback indicator.

In accordance with another aspect of the present invention, a UE device is provided for performing a feedback for CoMP communication in a communication system. The UE device includes a controller that checks a number of feedback allocations configured by Radio Resource Control (RRC) signaling, determines a number of bits of an aperiodic feedback indicator, based on the checked number of feedback allocations, and interprets the aperiodic feedback indicator, based on the determined number of bits of the aperiodic feedback indicator, and a transceiver that receives Downlink Control Information (DCI) including the aperiodic feedback indicator and performs aperiodic feedback of at least one feedback allocation, based on the aperiodic feedback indicator.

In accordance with another aspect of the present invention, a network device is provided for performing feedback for CoMP communication in a communication system. The network device includes a controller that checks a number of feedback allocations configured by Radio Resource Control (RRC) signaling, determines a number of bits of an aperiodic feedback indicator, based on the checked number of feedback allocations, and generates Downlink Control Information (DCI) including the aperiodic feedback indicator, and a transceiver that transmits the DCI to a User Equipment (UE) and receives at least one aperiodic feedback from the UE, based on the aperiodic feedback indicator.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF THE EXEMPLARY EMBODIMENT

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Although various embodiments of the present invention will be described below with reference to an Orthogonal Frequency Division Multiplexing (OFDM)-based wireless communication system, i.e., the 3GPP Evolved Universal Terrestrial Radio Access (EUTRA) standard, the present invention is equally applicable to other communication systems having a similar technical background and channel format, with slight modification, without departing from the scope of the present invention.

An Orthogonal Frequency Division Multiple Access (OFDMA) scheme improves system capacity when compared to a Code Division Multiple Access (CDMA) scheme. One reason that the OFDMA scheme increases the capacity increase is that the OFDMA scheme can perform scheduling in the frequency domain, i.e., frequency domain scheduling. Consequently, a great deal of research has been performed for converting CDMA, which is a multiple access scheme used in $2^{nd}$-Generation and $3^{rd}$-Generation mobile communication systems, into OFDMA in the next-generation system. For example, 3GPP and 3GPP2 have started standardization of evolved systems using OFDMA.

Figure 1:
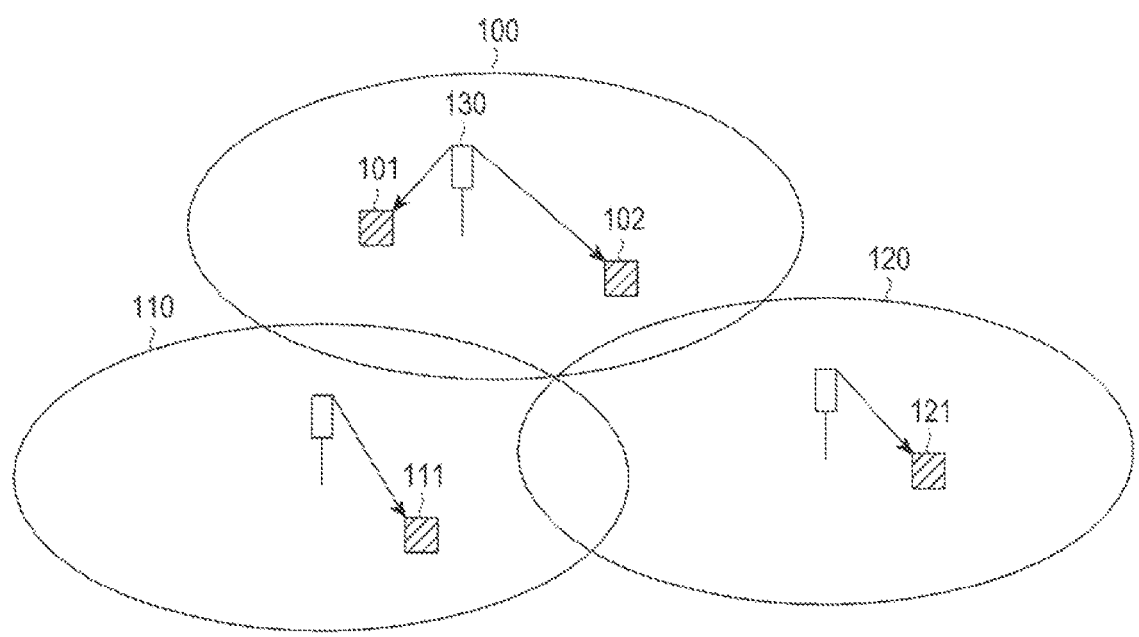
FIG. 1 illustrates a conventional cellular mobile communication system in which a transmission/reception antenna is located at a center of each cell.

FIG. 1 illustrates a conventional cellular mobile communication system in which a transmission/reception antenna is located at a center of each cell. In a cellular mobile communication system formed of a plurality of cells, a UE is provided with a mobile communication service using the above-described various techniques from a selected cell during a semi-static period.

Referring to FIG. 1, the cellular mobile communication system includes three cells 100, 110, and 120. Cell 100 provides a mobile communication service to UE 101 and UE 102, which are located in cell 100. Cell 110 provides a mobile communication service to UE 111, and cell 120 provides a mobile communication service to UE 121.

As illustrated in FIG. 1, UE 102 is farther away from antenna 130 of cell 100 than UE 101. Consequently, UE 102 is likely to experience interference caused by a central antenna of cell 120, such that data transmission speed supported by cell 100 is relatively low.

Cells 100, 110, and 120 transmit RSs for channel estimation to allow UEs 101, 102, 111, and 121 to measure a downlink channel state for each respective cell. In particular, in a 3GPP LTE-A system, UEs 101, 102, 111, and 121 measure a channel state between a plurality of Node Bs (or enhanced Node Bs (eNBs)) and themselves by using CSI-RSs transmitted by Node Bs of cells 100, 110, and 120. The CSI-RSs are matched to predefined positions in resource spaces used for transmission by the Node Bs, and the positions are known to the UEs 101, 102, 111, and 121.

Figure 2:
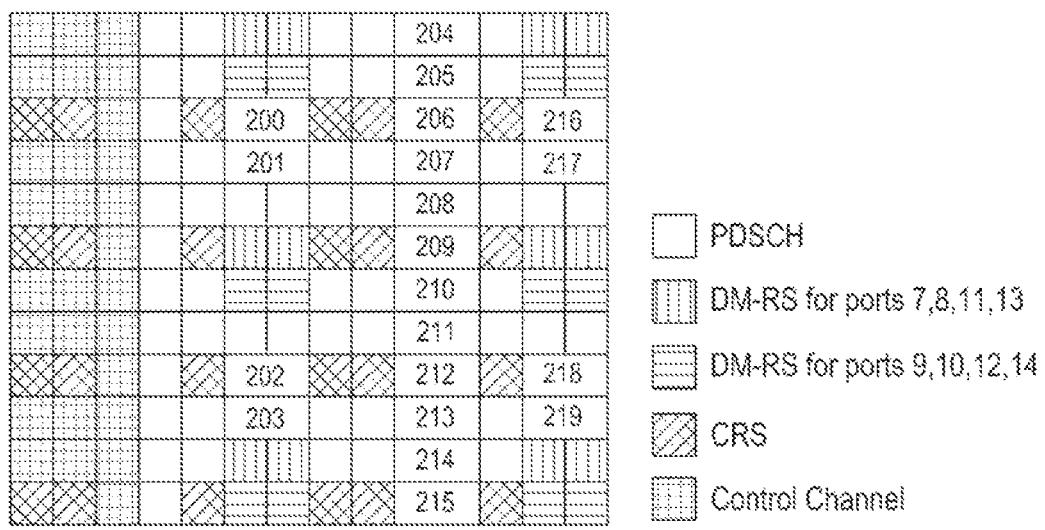
FIG. 2 illustrates a position of a conventional CSI-RS a Node B transmits to a UE in an LTE-A system.

FIG. 2 illustrates a position of a conventional CSI-RS a Node B transmits to a UE in an LTE-A system.

Referring to FIG. 2, in a resource space of a predefined size, RSs are disposed in time and frequency units defined according to a predefined pattern. Resource units 200 through 219 may include at least one OFDM symbol and at least one subcarrier, and may convey two signals for CSI-RS antenna ports in each position. For example, a Node B transmits, to a UE, two CSI-RSs for downlink measurement in position 200. In a cellular mobile communication system formed of a plurality of cells, CSI-RSs are allocated to different positions for different cells.

For example, cell 100, as illustrated in FIG. 1, transmits CSI-RSs in position 200, cell 110 transmits CSI-RSs in position 205, and cell 120 transmits CSI-RSs in position 210. Accordingly, by allocating time-frequency resources for CSI-RS transmission in different positions for different cells, respectively, CSI-RSs of different cells do not interfere with each other.

A UE estimates a downlink channel through a CSI-RS, generates, as channel information for the estimated channel, feedback information, e.g., a Rank Indicator (RI), a Channel Quality Indicator (CQI), a Precoding Matrix Indicator (PMI), etc., and performs feedback to a BS. The UE may perform periodic feedback via a Physical Uplink Control Channel (PUCCH), and the periodic feedback may be performed in one of four feedback modes:

1. Mode 1-0: RI, wideband CQI (wCQI)
2. Mode 1-1: RI, wCQI, wideband PMI (wPMI)
3. Mode 2-0: RI, wCQI, subband PMI (sCQI)
4. Mode 2-0: RI, wCQI, wPMI, sCQI, sPMI A feedback timing of individual information regarding the four feedback modes is determined by parameters $N_{pd}$, $N_{OFFSET,CQI}$, $M_{RI}$, $N_{OFFSET,RI}$, etc., forwarded through a higher layer signal. In the feedback mode, Mode 1-0, a transmission period of wCQI is $N_{pd}$ subframes and a feedback timing thereof is determined by a subframe offset of $N_{OFFSET,CQ}$. A transmission period of RI is $N_{pd} \times M_{RI}$, and a subframe offset for determining a feedback timing of RI is determined by $N_{OFFSET,CQI} \pm N_{OFFSET,RI}$.

Figure 3:
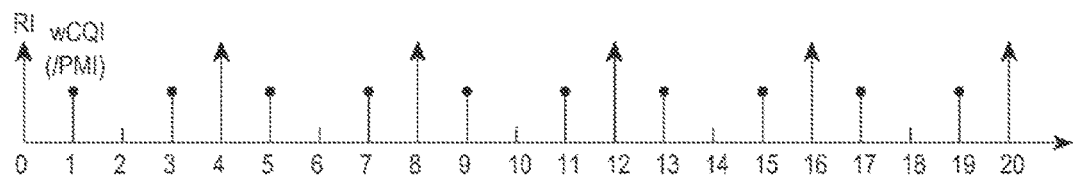
FIG. 3 illustrates an example of a conventional feedback timing of a UE in a feedback mode 1-0 or 1-1 in an LTE-A system.

FIG. 3 illustrates an example of a conventional feedback timing of a UE in Mode 1-0 or 1-1 in an LTE-A system.

Referring to FIG. 3, feedback timings of RI and wCQI for $N_{pd}=2$, $M_{RI}=2$, $N_{OFFSET,CQI}=1$, and $N_{OFFSET,RI}=-1$ are illustrated. Herein, each timing is indicated by a subframe index. That is, RI is transmitted in subframes 0, 4, 8, . . . , and wCQI is transmitted in subframes 1, 3, 5, 7, . . . Mode 1-1 has a feedback timing such as Mode 1-0, but unlike in the feedback mode, Mode 1-0, at a transmission timing of wCQI, PMI is also transmitted.

In the feedback mode, Mode 2-0, a feedback interval of sCQI is $N_{pd}$ and an offset thereof is $N_{OFFSET,CQ}$. A feedback interval of wCQI is $H \times N_{pd}$ and an offset thereof is $N_{OFFSET,CQI}$ that is the same as the offset of sCQI. Herein, $H=J \times K+1$, in which K is a value conveyed through higher-layer signaling and J is a value determined according to system bandwidth. For example, a value of J for a 10 MHz system is defined as 3. Finally, wCQI is transmitted in place of sCQI once per H transmissions of sCQI. A period of RI is $M_{RI} \times H \times N_{pd}$ and an offset thereof is $N_{OFFSET,CQI} + N_{OFFSET,RI}$.

Figure 4:
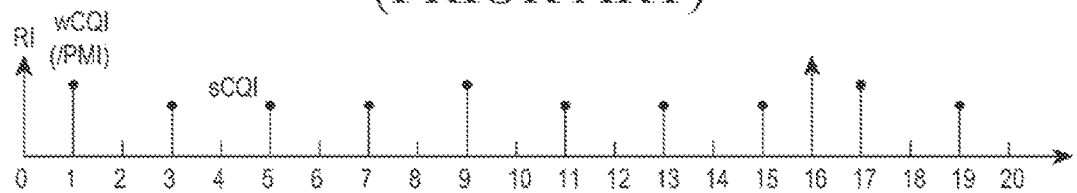
FIG. 4 illustrates an example of a conventional feedback timing of a UE in a feedback mode 2-0 or 2-1 in an LTE-A system.

FIG. 4 illustrates an example of a conventional feedback timing of a UE in Mode 2-0 or 2-1.

Referring to FIG. 4, feedback timings of RI, sCQI, and wCQI for $N_{pd}=2$, $M_{RI}=2$, J=3 (10 MHz), K=1, $N_{OFFSET,CQI}=1$, and $N_{OFFSET,RI}=-1$ are illustrated. In this example, RI is transmitted in subframes 0, 16, . . . , sCQI is transmitted in subframes 3, 5, 7, 11, . . . , and wCQI (together with PMI) is transmitted in subframes 1, 9, 17, . . . . The feedback mode, Mode 2-1, has the same feedback timing as Mode 2-0, and PMI is also transmitted at the transmission timing of wCQI.

The above-described feedback timing is associated with less than 4 CSI-RS antenna ports.

When 8 CSI-RS antenna ports are used, two types of PMI are fed back. For the 8 CSI-RS antenna ports, Mode 1-1 is divided into two submodes. In the first submode, first PMI is transmitted together with RI and second PMI is transmitted together with wCQI. Herein, feedback intervals and offsets of wCQI and the second PMI are defined as $N_{pd}$ and $N_{OFFSET,CQI}$, and feedback intervals and offsets of RI and the first PMI are defined as $M_{RI} \times N_{pd}$ and $N_{OFFSET,CQI} + N_{OFFSET,RI}$.

In the second submode, RI is individually transmitted and first PMI is transmitted together with second PMI and wCQI. Herein, feedback intervals and offsets of wCQI, the first PMI, and the second PMI are defined as $N_{pd}$ and $N_{OFFSET,CQI}$, and feedback interval and offset of RI is defined as $M_{RI} \times N_{pd}$ and $N_{OFFSET,CQI} + N_{OFFSET,RI}$.

Mode 2-1 for the 8 CSI-RS antenna ports further includes a Precoding Type Indicator (PTI), which is fed back together with RI, and a feedback interval of the PTI is defined as $M_{RI} \times H \times N_{pd}$ and an offset thereof is defined as $N_{OFFSET,CQI} \pm N_{OFFSET,RI}$.

For PTI=0, the first PMI, the second PMI, and wCQI are fed back, and wCQI and the second PMI are transmitted together at the same timing. Feedback intervals of wCQI and the second PMI are $N_{pd}$ and offsets thereof are $N_{OFFSET,CQ}$. A feedback interval of the first PMI is $H' \times N_{pd}$ and an offset thereof is $N_{OFFSET,CQ}$. Herein, H' is conveyed through higher-layer signaling.

For PTI=1, PTI and RI are transmitted together, wCQI and the second PMI are transmitted together, and sCQI is further fed back. The first PMI is not transmitted. Feedback intervals and offsets of PTI and RI are the same as those for PTI=0. A feedback interval of sCQI is $N_{pd}$ and an offset thereof is $N_{OFFSET,CQ}$. wCQI and the second PMI are fed back with a period of $H \times N_{pd}$ and an offset of $N_{OFFSET,CQ}$. Herein, H is defined as the same as a case where the number of CSI-RS antenna ports is 4.

Figure 5:
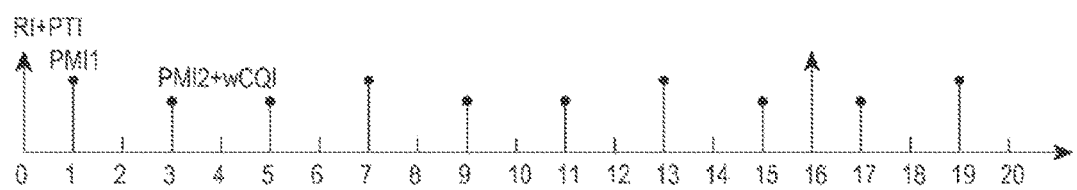
FIG. 5 illustrates another example of a conventional feedback timing of a UE in a feedback mode 2-0 or 2-1 in an LTE-A system.
Figure 6:
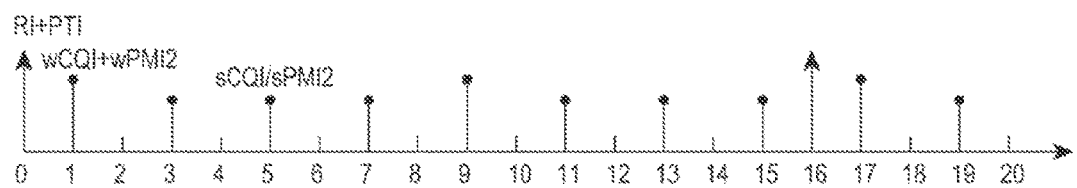
FIG. 6 illustrates another example of a conventional feedback timing of a UE in a feedback mode 2-0 or 2-1 in an LTE-A system.

FIGS. 5 and 6 illustrate examples of conventional feedback timings of a UE in Mode 2-0 or 2-1, when $N_{pd}=2$, $M_{R1}=2$, J=3 (10 MHz), K=1, H'=1 $N_{OFFSET,CQI}=1$, and $N_{OFFSET,RI}=-1$. Specifically, feedback timings for PTI=0 and PTI=1 are illustrated.

Referring to FIG. 5, RI and PTI are transmitted in subframes 0, 16, . . . ; the first PMI is transmitted in subframes 1, 7, 13, . . . ; and the second PMI and wCQI are transmitted in subframes 3, 5, 9, 11, . . . .

Referring to FIG. 6, RI and PTI are transmitted in subframes 0, 16, . . . ; the second PMI and wCQI are transmitted in subframes 1, 9, 17, . . . ; and the second PMI and sCQI are transmitted in subframes 3, 5, 7, 11, . . . .

Downlink channel information estimated through a CSI-RS may be forwarded from a Node B to a UE through aperiodic feedback via a Physical Uplink Shared Channel (PUSCH). When a Node B desires to obtain aperiodic feedback information of a particular UE, the Node B may set an aperiodic feedback indicator included in Downlink Control Information (DCI) for UpLink (UL) data scheduling of the UE to indicate aperiodic feedback and transmit the set aperiodic feedback indicator to the UE. The UE, upon receiving the aperiodic feedback indicator from a subframe #n, includes the aperiodic feedback information in UL data transmission in a subframe #(n+k). Herein, k is a predefined parameter, e.g., 4 in Frequency Division Duplexing (FDD), and may be defined according to a subframe number, n, in Time Division Duplexing (TDD), as shown in Table 1 below.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In Table 1, TDD UL/DL configuration designates positions of UL subframes and DL subframes in a TDD frame. For example, TDD UL/DL configuration #0 may indicate that subframes 2, 3, 4, 7, and 8 are UL subframes.

The aperiodic feedback indicator is included in UL DCI format 0 or DCI format 4 and may be defined with one bit or two bits. For the aperiodic feedback indicator of one bit, if it is set to ON, the UE forwards channel information regarding "serving cell c" to the Node B through a PUSCH aperiodic feedback. Herein, "serving cell c" represents at least one DL Component Carrier (CC) in which DCI is transmitted in a Carrier Aggregation (CA) situation. According to an aggregation level, one or more subcarriers may be allocated as a resource space for DCI transmission. The UE monitors a search space defined as a resource space in which DCI can be transmitted to attempt to detect the DCI.

However, for the aperiodic feedback indicator of two bits, the UE may perform aperiodic feedback as defined in Table 2 below.

TABLE 2

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In Table 2, "serving cell c" refers to a DL CC linked to a UL CC indicated by a Carrier Indication Field (CIF) included in a DCI for UL scheduling. The UE, upon receiving an aperiodic feedback indicator set to '01', transmits feedback information of the DL CC linked to the UL CC, in the UL CC indicated by the CIF.

The UE, upon receiving an aperiodic feedback indicator set to '10' or '11', transmits, in the UL CC indicated by the CIF, feedback information regarding the DL CC set by a higher layer. The CSI report is a feedback report of one or more feedback allocations or CSI process.

When aperiodic feedback is set, feedback information for each CC includes RI, PMI, and CQI, like in periodic feedback, and according to feedback configuration, RI and PMI may optionally be fed back. The CQI may include both wCQI and sCQI or may include only wCQI.

As described above, in a cellular mobile communication system, a UE located at an edge of a cell often experiences interference from another cell, and thus, has some limitation in being supported with a high data rate.

More specifically, a high data rate provided to UEs in a cell is greatly affected by a position of a UE in the cell. Thus, in a conventional cellular mobile communication system, a UE located closer to the center of a cell may be provided with a higher data rate than a UE located farther from the center of the cell. When compared to a conventional system in which a UE is supported with a service from only a semi-statically determined cell, a CoMP system has been developed. The CoMP system transmits data through cooperation among a plurality of cells to support a UE located at an edge of a cell, thereby providing a further enhanced mobile communication service.

A UE located at an edge of a cell in a CoMP system may dynamically determine a cell from which data is to be received. Several cells determined as large interference sources may turn off their power to help UEs situated at edges of neighboring cells. In addition, several cells may simultaneously transmit information to a UE located at an edge of a cell, thus improving an information reception rate of the UE. As a result, all UEs in a cellular mobile communication system may equally obtain high data rates, regardless of their positions in respective cells.

The embodiments of the present invention described below provide feedback considering a Dynamic cell Selection (DS) scheme, a DS with Dynamic Blanking (DS/DB) scheme, and a Joint Transmission (JT) scheme in a CoMP system.

In the DS scheme, once a UE measures a channel state per cell and forwards a feedback regarding the per-cell channel state to a Node B, the Node B dynamically selects a cell for transmitting DL data to the UE and transmits the data to the UE.

In the DS/DB scheme, a particular cell does not perform its data transmission to reduce interference introduced to another cell.

In the JT scheme multiple cells simultaneously transmit data to a particular UE.

Figure 7:
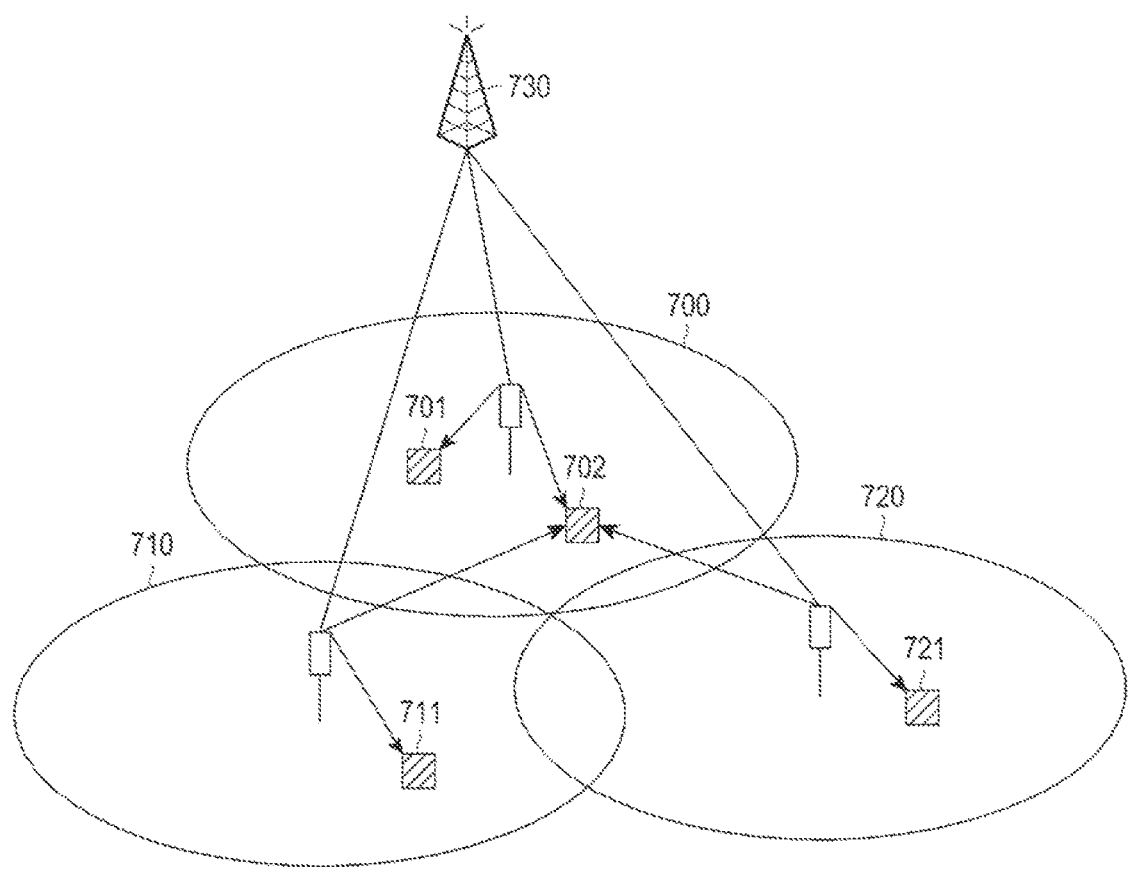
FIG. 7 illustrates a cellular mobile communication system according to an embodiment of the present invention.

FIG. 7 illustrates a cellular mobile communication system according to an embodiment of the present invention.

Referring to FIG. 7, the cellular mobile communication system includes three cells 700, 710, and 720. Herein, "a cell" refers to a data transmission space that can be serviced by a particular transmission point (e.g., Node B), and each transmission point may be a Remote Radio Head (RRH) having a cell IDentifier (ID), which is common with a macro Node B in a macro space, or may be a macro or pico cell having a different unique cell ID.

Herein, when each transmission point is an RRH having a cell ID commonly with a macro Node B, the macro Node B may be referred to as a central control device. When each transmission point is a macro or pico cell having a different cell ID, a device for integrally managing respective cells may also be referred to as a central control device. Basically, a central control device transmits and receives data with a UE and processes transmitted/received data.

Referring to FIG. 7, UEs 701, 711, and 721 receive data from their one respective nearest cells, and UE 702 receives CoMP transmissions from cells 700, 710, and 720. A central control device 730 including a Node B or a separate entity, manages scheduling and resource allocation for cells 700, 710, and 720.

The non-CoMP UEs 701, 711, and 721, which receive data from their one respective nearest cell, respectively, estimate channels from CSI-RSs for cells in which the UEs 701, 711, and 721 are located, and transmit CSI feedback to the central control device 730 through the corresponding cells 700, 710, and 720.

UE 702, which receives data using a CoMP scheme from the three cells 700, 710, and 720, estimates channels from cells 700, 710, and 720. Thus, for channel estimation performed by UE 702, the central control device 730 allocates three CSI-RS resources to UE 720, corresponding to the three cells 700, 710, and 720 that participate in CoMP transmission.

Figure 8:
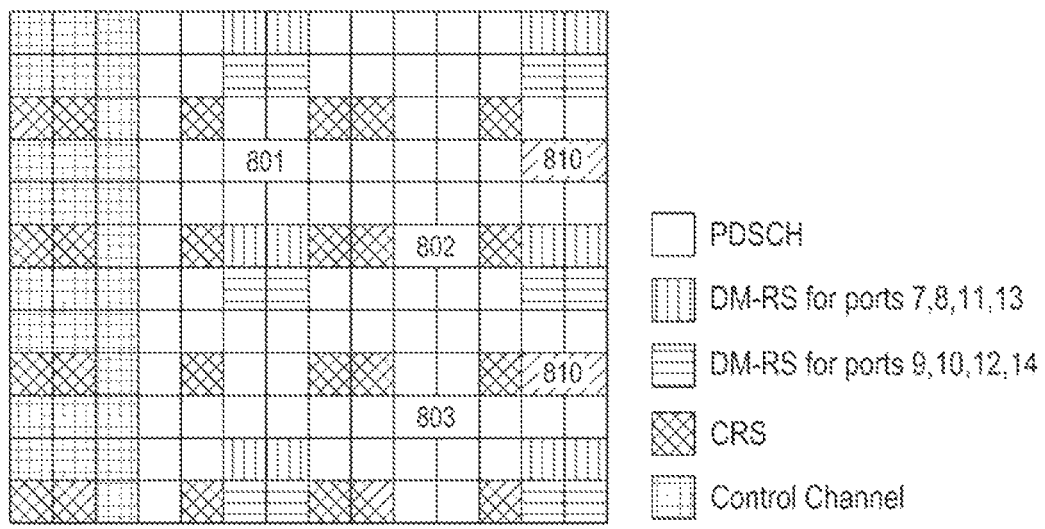
FIG. 8 is a diagram showing a position of a CSI-RS a Node B transmits to a UE according to an embodiment of the present invention.

FIG. 8 illustrates a position of a CSI-RS a Node B transmits to a UE according to an embodiment of the present invention.

Referring to FIG. 8, the central control device 730 allocates three CSI-RS signals to three resource units 801, 802, and 803 to allow UE 702 receiving CoMP transmissions to estimate channels from the three cells 700, 710, and 720, and transmits the CSI-RSs using the allocated resource units 801, 802, and 803.

More specifically, a CSI-RS for channel estimation of cell 700 is allocated to resource unit 801, a CSI-RS for channel estimation of cell 710 is allocated to resource unit 802, and a CSI-RS for channel estimation of cell 720 is allocated to resource unit 803. A set of resource units to which at least one CSI-RS transmitted for channel estimation of a CoMP UE or a set of cells corresponding to the CSI-RS resources is referred to as a measurement set.

Alternatively, the central control device 730 may allocate an additional resource for measuring interference to the UE 702.

The amount of data per time a UE can receive is affected by an amplitude of interference as well as an intensity of a signal. Therefore, the central control device 730 may separately allocate Interference Measurement Resources (IMRs) with which UE 702 can measure interference for more accurate interference measurement. For example, the central control device 730 allocates a single IMR to one UE to allow the UE to measure the amount of interference commonly applied to signal components for all CSI-RSs in a measurement set or allocates several IMRs to one UE to allow the UE to measure various interference situations.

Referring to FIG. 8, UE 702 measures signals from the three cells 700, 710, and 720 using the three allocated CSI-RS resource units 801, 802, and 803, and measures interference generated when receiving the signals from the three cells 700, 710, and 720 through an allocated IMR 810. The central control device 730 controls signal transmission of neighboring cells in the IMR 810 to reflect well in the IMR 810 interference with respect to the UE 702.

Hereinafter, a description will be made of an operation, by a Node B (or a central control device), for indicating one or more feedback allocations to be generated by a UE, and an operation, by the UE, for generating and transmitting the indicated feedback, when the UE is not allocated with IMR.

Support of DL CoMP introduces new CSI feedback for various CoMP schemes. As conventional CSI feedback considers only one TP and one CSI reference signal for the channel measurement and CSI feedback report, with conventional CSI feedback, it is not possible to support the CoMP schemes from multiple TPs that utilize multiple CSI reference signals. Accordingly, the additional CSI feedback for multiple TPs (or CSI feedback for corresponding CSI-RS configurations) is required to support DL CoMP schemes.

Feedback for CoMP schemes can be categorized as Multiple CSI reports for multiple TPs, Additional feedback for DS/DB, and Additional feedback for JT.

For multiple CSI reports for multiple TPs, a Node B configures multiple CSI-RS configurations to a UE for CSI reports and each CSI-RS configuration corresponds to a specific TP. The case where one CSI-RS configuration corresponds to multiple TPs is also included. The set of multiple CSI-RS configurations (or the corresponding TPs) for CSI reports is defined as a feedback set (or measurement set). Each CSI report corresponds to a CSI-RS configuration for a TP.

For the Additional feedback for DS/DB, some TPs (e.g., macro Node Bs) can be turned off (blanking) in order to help downlink data reception of UEs attached to other TPs. At least one UE feeds back additional CSI for blanking.

For the Additional feedback for JT, multiple TPs can simultaneously transmit data for one UE. JT may require additional CSI for co-transmission from multiple TPs.

A CSI report for CoMP may be transmitted either separately from data information in a PUCCH or together with data information in a PUSCH. Therefore, a CSI report should be provided for CoMP via PUSCH and PUCCH, respectively.

A CSI report should be provided for CoMP via PUSCH due to an increased size of CSI feedback information. That is, because multiple CSI reports are required for CoMP, the amount of feedback is not enough for PUCCH when multiple CSI reports are feedback simultaneously.

Another reason to provide a CSI report for CoMP via PUSCH is to include additional feedback for DS/DB or JT. These CoMP schemes require per-TP CSI feedback and also additional CSI feedback, which is conditioned on a certain interference assumption, or which includes inter-TP information for co-transmission from multiple TPs.

The aperiodic CSI report is transmitted on a PUSCH for Multiple CSI Reports for Multiple TPs. The aperiodic CSI Report may configured by reusing a conventional CSI request field with a modified description or by increasing the size of CSI Request Field to include feedback information for CoMP. A new CSI request field with a modified description is shown below in Table 3.

TABLE 3

| CA | CoMP | CIF | CSI request | New CSI request | Description |
|---|---|---|---|---|---|
| No CA | No CoMP | 0 bit | 1 bit | — | Legacy Single Point Transmission |
| No CA | CoMP | 0 bit | 1 bit | 1 + x bits | CoMP feedback (x >= 0) |

TABLE 3-continued

| CA | CoMP | CIF | CSI request | New CSI request | Description |
|---|---|---|---|---|---|
| CA | No CoMP | 0/3 bits | 2 bits | — | Legacy Single Point CA Transmission |
| CA | CoMP | 0/3 bits | 2 bits | 2 + y bits (y >= 0) | CA + CoMP |

The Radio Resource Control (RRC) signaling from an eNB to a UE sends CSI-RS-Configuration-Indicator-Presence field indicating whether the new (i.e., updated) CSI Request field is used or not for CoMP feedback. Whether the new CSI Request field is used for CoMP feedback or not can be dependent on at least one of (1) the number of non-zero-power CSI-RS resources may be configured by the eNB, (2) the number of interference assumptions may be configured by the eNB, and (3) the number of feedback configurations may be indicated by the eNB, without the above RRC signaled CSI-RS-Configuration-Indicator-Presence.

The RRC signaling may send the Optional Aperiodic-CSI-RS-Configuration-Trigger field indicating for which CSI-RS configurations the aperiodic CSI report is triggered when one or more CSI-RS configurations are configured. This field can be defined for each serving cell (or CC).

Two different sets from RRC signaling are referred for CA and CoMP. One set is for the CA, and each CC is called a serving cell. For example, an aperiodic CSI report is triggered for a 1st set of serving cells configured by higher layers. Another set is for the CoMP. A CSI feedback report for each TP for CoMP corresponds to the set of CSI-RS configurations in a CoMP measurement set. For example, an Aperiodic CSI report is triggered for a 1st set of CSI-RS configurations (in CoMP measurement set) configured by higher layers. In following example, the description of 'in CoMP measurement' is omitted for brevity.

Tables 4 to 7 below show descriptions of examples of the new CSI request field, when a conventional CSI Request field is 1 bit, and the new CSI Request field is 1 bit.

TABLE 4

| Value of CSI request field | Description |
|---|---|
| '0' | No aperiodic CSI report is triggered |
| '1' | Aperiodic CSI report is triggered for single CSI-RS configuration in CoMP measurement set |

TABLE 5

| Value of CSI request field | Description |
|---|---|
| '0' | No aperiodic CSI report is triggered |
| '1' | Aperiodic CSI report is triggered for best-m CSI-RS configurations in CoMP measurement set |

TABLE 6

| Value of CSI request field | Description |
|---|---|
| '0' | No aperiodic CSI report is triggered |
| '1' | Aperiodic CSI report is triggered for all CSI-RS configurations in CoMP measurement set |

TABLE 7

| Value of CSI request field | Description |
|---|---|
| '0' | No aperiodic CSI report is triggered |
| '1' | Aperiodic CSI report is triggered for 1-st set of CSI-RS configurations configured by higher layers |

Tables 8 to 10 show descriptions of new CSI request fields, when a conventional CSI Request field is 1 bit and new CSI Request field is 2 bits.

TABLE 8

| Value of CSI request field | Description |
|---|---|
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE |
| '11' | Aperiodic CSI report is triggered for 1-st set of CSI-RS configurations configured by higher layers |

TABLE 9

| Value of CSI request field | Description |
|---|---|
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE |
| '11' | Aperiodic CSI report is triggered for all CSI-RS configurations in CoMP measurement set |

TABLE 10

| Value of CSI request field | Description |
|---|---|
| '00' | No aperiodic CSI report is triggered |
| '01' | Aperiodic CSI report is triggered for 1-st set of CSI-RS configurations configured by higher layers |
| '10' | Aperiodic CSI report is triggered for 2nd set of CSI-RS configurations configured by higher layers |
| '11' | Aperiodic CSI report is triggered for 3-rd set of CSI-RS configurations configured by higher layers |

Tables 11 and 12 show descriptions of new CSI request fields when a conventional CSI Request field is 2 bits and new CSI Request field is 2 bits.

TABLE 11

| Value of CSI request field | Description |
|---|---|
| '00' | No aperiodic CSI report is triggered |
| '01' | Aperiodic CSI report is triggered for all CSI-RS configurations in CoMP measurement set for serving cell c |
| '10' | Aperiodic CSI report is triggered for a 1-st set of CSI-RS Configurations and a 1-st set of serving cells configured by higher layers |
| '11' | Aperiodic CSI report is triggered for a 2-nd set of CSI-RS configurations and a 2-nd set of serving cells configured by higher layers |

TABLE 12

| Value of CSI request field | Description |
| --- | --- |
| '00' | No aperiodic CSI report is triggered |
| '01' | Aperiodic CSI report is triggered for single CSI-RS configuration in CoMP measurement set for serving cell c |
| '10' | Aperiodic CSI report is triggered for a 1-st set of CSI-RS configurations and a 1-st set of serving cells configured by higher layers |
| '11' | Aperiodic CSI report is triggered for a 2-nd set of CSI-RS configurations and a 2-nd set of serving cells configured by higher layers |

Tables 13 and 14 show descriptions of new CSI request fields, when a conventional CSI Request field is 2 bits and a new CSI Request field is 3 bits.

TABLE 13

| Value of CSI request field | Description |
| --- | --- |
| '000' | No aperiodic CSI report is triggered |
| '010' | Aperiodic CSI report is triggered for single CSI-RS Configuration in CoMP measurement set for serving cell c |
| '100' | Aperiodic CSI report is triggered for single CSI-RS Configuration and a 1-st set of serving cells configured by higher layers |
| '110' | Aperiodic CSI report is triggered for single CSI-RS Configuration and a 2-nd set of serving cells configured by higher layers |
| '001' | Aperiodic CSI report is triggered for best-m CSI-RS Configurations which are selected by UE for serving cell c |
| '011' | Aperiodic CSI report is triggered for all CSI-RS Configurations in CoMP measurement set for serving cell c |
| '101' | Aperiodic CSI report is triggered for a 1-st set of CSI-RS Configurations and a 1-st set of serving cells configured by higher layers |
| '111' | Aperiodic CSI report is triggered for a 2-nd set of CSI-RS Configurations and a 2-nd set of serving cells configured by higher layers |

TABLE 14

| Value of CSI request field | Description |
| --- | --- |
| '000' | No aperiodic CSI report is triggered |
| '010' | Aperiodic CSI report is triggered for single CSI-RS Configuration in CoMP measurement set for serving cell c |
| '100' | Aperiodic CSI report is triggered for single CSI-RS Configuration and a 1-st set of serving cells configured by higher layers |
| '110' | Aperiodic CSI report is triggered for single CSI-RS Configuration and a 2-nd set of serving cells configured by higher layers |
| '001' | Aperiodic CSI report is triggered for best-m CSI-RS Configurations which are selected by UE for serving cell c |
| '011' | Aperiodic CSI report is triggered for all CSI-RS Configurations in CoMP measurement set for serving cell c |
| '101' | Aperiodic CSI report is triggered for a 1-st set of CSI-RS Configurations and a 1-st set of serving cells configured by higher layers |
| '111' | Aperiodic CSI report is triggered for a 2-nd set of CSI-RS Configurations and a 2-nd set of serving cells configured by higher layers |

Hereinafter, a description will be made of an operation, by a Node B (or a central control device), for indicating to a UE one or more feedbacks to be generated by the UE, and an operation, by the UE, for generating and transmitting the indicated feedback(s), when the UE is allocated with a measurement set for several cells or is allocated with several IMRs.

When the UE is allocated with a measurement set for several cells and with one or more IMRs, the Node B allocates several feedback transmissions to the UE for combinations of possible signals and interference, generates feedback information based on allocation of the Node B, and forwards the feedback information to the Node B at a predefined feedback transmission timing.

For example, a measurement set allocated to the UE may be {CSI-RS-1, CSI-RS-2}, where CSI-RS-1 and CSI-RS-2 indicate CSI-RS signals transmitted from a Cell-1 and a Cell-2, respectively. The UE is allocated with one IMR from the Node B, and the IMR is configured to reflect interference from cells, except for the measurement set. The Node B may allocate a feedback for a maximum of 4 possible signal-and-interference cases as shown in Table 15 to the UE, and the UE may generate and transmit the allocated feedback.

TABLE 15

| | Signal Component | Interference | Consideration |
| --- | --- | --- | --- |
| Case 1 | Cell-1 | IMR + Cell-2 | No blanking |
| Case 2 | Cell-1 | IMR | Blanking of Cell-2 |
| Case 3 | Cell-2 | IMR + Cell-1 | No blanking |
| Case 4 | Cell-2 | IMR | Blanking of Cell-1 |

In Table 15, a channel measured from a CSI-RS in a measurement set may include interference. In Table 15, IMR+Cell-2 indicates that the UE recognizes a sum of interference measured in IMR and interference measured in CSI-RS-2 corresponding to Cell-2 as a total interference corresponding to Case 1. That is, in Table 15, Case 1 is a situation in which a desired signal is received from Cell-1 and interference is received from cells, except for a measurement set reflected in Cell-2 and IMR.

Case 2 is a situation in which a desired signal is received from Cell-1, no signal is received from Cell-2, and interference is received only from cells, except for a measurement set reflected in IMR. In Case 2, Cell-2 is in a blanking state in which no signal is transmitted.

Likewise, Case 3 and Case 4 refer to a situation in which Cell-1 is not in the blanking state and a situation where Cell-1 is in the blanking state, respectively, while in both of the situations, a signal is received from Cell-2.

When the UE performs feedback for all the possible situations shown in Table 15, it may require large feedback overhead and UE complexity. Thus, the Node B forwards, to the UE, an RRC signal indicating which feedback among possible feedbacks the UE is to generate, and the UE then transmits only corresponding feedbacks (FBs) in response to the RRC signal.

For example, if determining that only Case 1 and Case 3 are valid among the possible cases shown in Table 15, the Node B transmits RRC information indicating a valid signal-and-interference combination to the UE.

FB 1: Signal Component (CSI-RS-1), Interference Component (IMR+CSI-RS-2)

FB 2: Signal Component (CSI-RS-2), Interference Component (IMR+CSI-RS-1)

The RRC information indicating a valid signal-and-interference combination to the UE may be separately generated for periodic feedback and an aperiodic feedback. That is, possible signal-and-interference combinations for periodic feedback may correspond to Case 1 and Case 3 in Table 15, whereas possible signal-and-interference combinations for an aperiodic feedback may correspond to Case 1, Case 2, Case 3, and Case 4, because an aperiodic feedback may include a larger amount of feedback information than periodic feedback, and two types of feedbacks may be used in various ways according to implementation of the Node B.

An example of RRC information indicating a valid signal-and-interference combination includes the UE generating possible interference information by adding a measurement value of one IMR and a measurement value of possible CSI-RS in a measurement set.

Alternatively, RRC information may be generated in various other ways. For example, the Node B may allocate several IMRs to the UE and the UE then reflects various interference situations in a feedback merely based on interference measured for the IMRs. As another example, by combining several IMRs with a measurement set, various interference situations may be reflected in a feedback.

The RRC information indicating a valid signal-and-interference combination may further include information about which feedback information a feedback for a corresponding combination situation includes. That is, through RRC information, the Node B may inform the UE of which channel information among RI, PMI, wCQI, and sCQI the feedback corresponding to the RRC information indicating the possible signal-and-interference combination includes. The information regarding which channel information the feedback includes may be separately configured for periodic feedback and aperiodic feedback. The RRC information for feedback configuration corresponding to periodic feedback may further include execution timing and resource information to be used for each feedback.

Upon receiving a valid signal-and-interference combination and information about which channel information is to be included for feedback, the UE performs periodic feedback using an allocated resource at a given timing without separate scheduling.

For aperiodic feedback, upon receiving an indicator set to perform aperiodic feedback in a subframe #n, the UE includes aperiodic feedback information in data transmission in a subframe #(n+k). Herein, k is 4 in FDD and may be defined as shown in Table 1 in TDD. That is, when the Node B desires to obtain aperiodic feedback information of a particular UE, the Node B sets an aperiodic feedback indicator included in DCI for UL data scheduling of the UE to indicate aperiodic feedback, and performs UL data scheduling of the UE. Then, the UE performs a feedback operation corresponding to the aperiodic feedback indicator set by the Node B, i.e., an aperiodic feedback operation.

In a system considering CoMP, the aperiodic feedback indicator may be included in UL DCI format 0 and DCI format 4, and may be defined with one bit or two bits in each DCI.

The Node B allocates one or more periodic feedbacks to a CoMP operating UE and/or allocates one or more CCs for DCI transmission, through RRC information for example. The Node B also transmits the aperiodic feedback indicator defined with one bit or two bits through DCI. In this case, the number of bits of the aperiodic feedback indicator is determined based on the number of allocated aperiodic feedbacks and/or the number of allocated CCs, and whether DCI for the UE is transmitted in a common search space or a UE-specific search space. The Node B sets a value of the aperiodic feedback indicator according to one of Table 16 through Table 27, as will be described below.

A description will now be made of an operation for defining the aperiodic feedback indicator of one bit or two bits when CA and CoMP are not used at the same time. For a UE that is set to CoMP-only, in which CA is not used, the number of bits of the aperiodic feedback indicator is determined according to the number of one or more feedback allocations allocated to the UE for CoMP and a type of a control channel in which DCI for UL scheduling is transmitted. Herein, the number of one or more feedback allocations allocated to the UE for CoMP corresponds to the number of signal-and-interference combinations for aperiodic feedback included in RRC information for possible signal-and-interference combinations for CoMP.

Figure 9:
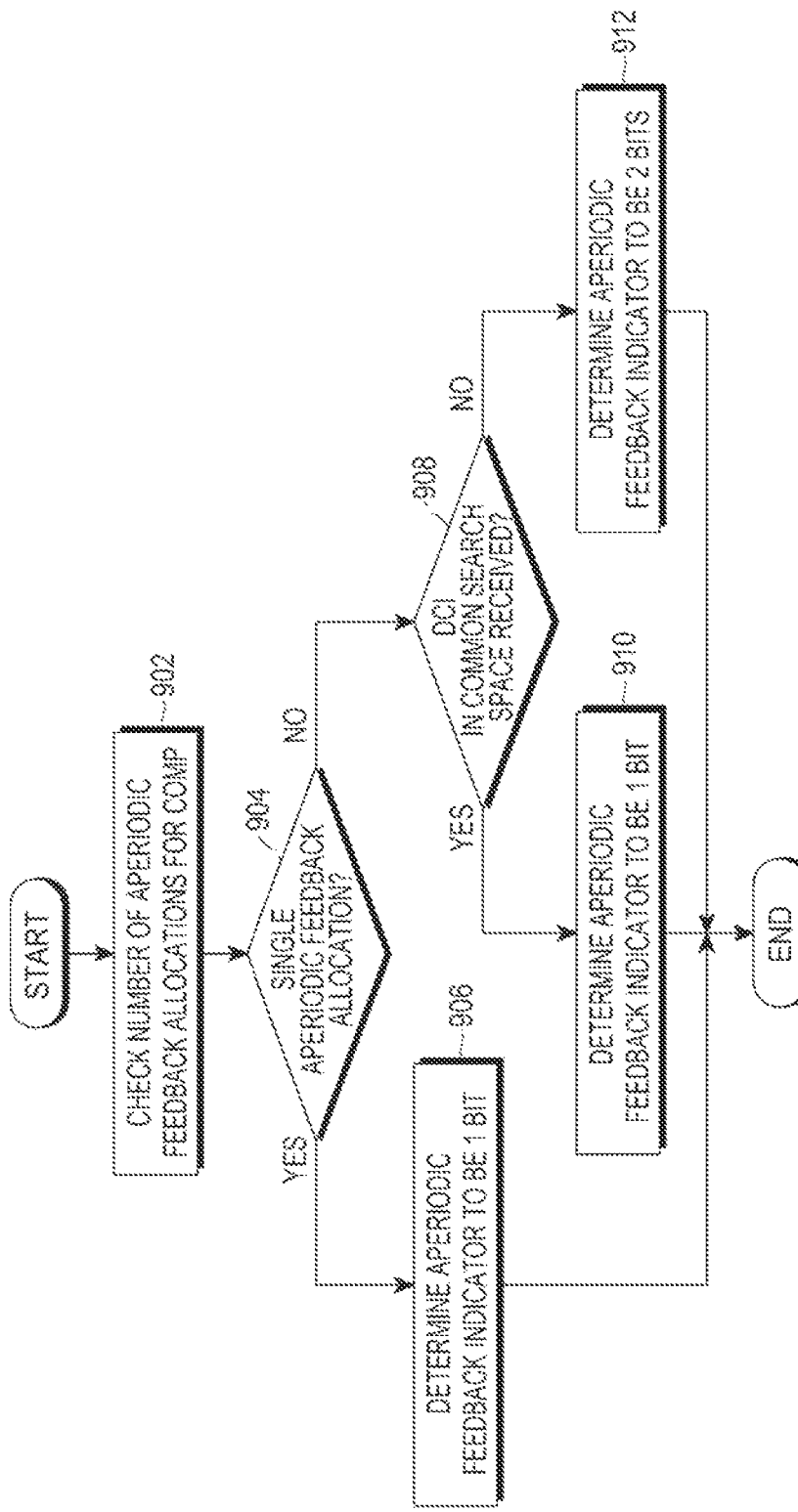
FIG. 9 is a flowchart illustrating a method of determining a number of bits of an aperiodic feedback indicator in a CoMP-only situation according to an embodiment of the present invention.

FIG. 9 is a flowchart illustrating a method of determining a number of bits of an aperiodic feedback indicator in a CoMP-only situation according to an embodiment of the present invention.

Referring to FIG. 9, a UE checks the number of feedback allocations allocated by a Node B via RRC signaling in step 902, and determines whether the number of feedbacks allocations is 1, i.e., whether a single feedback is allocated, in step 904. For the single feedback allocation, the UE recognizes the aperiodic feedback indicator as 1 bit in step 906, and interprets the 1-bit aperiodic feedback indicator disposed in a particular position of DCI.

However, if two or more feedback allocations are received, i.e., for multiple feedback allocations, the UE determines whether to receive DCI in a common search space of a PDCCH or receive a UE-specific search space of the PDCCH, taking into account in which channel DCI for UL scheduling is transmitted, in step 908. Herein, the search space refers to a resource space in which the DCI of the PDCCH can be transmitted, and may include one or more subcarriers and one or more symbols.

When receiving the DCI of the common search space, the UE determines the aperiodic feedback indicator to be 1 bit, in step 910. However, if receiving UL DCI in the UE-specific search space of the PDCCH, the UE determines the aperiodic feedback indicator to be 2 bits in step 912.

When the aperiodic feedback indicator is configured with 1 bit for a UE configured with a single CC, the aperiodic feedback indicator may be defined in the following three methods.

According to a first method of defining the aperiodic feedback indicator, as shown in Table 16, if the aperiodic feedback indicator is set to OFF ('0') in a subframe #n, the UE determines not to perform aperiodic feedback; if the aperiodic feedback indicator is set to ON ('1'), the UE determines to simultaneously transmit, in a subframe #(n+k), aperiodic feedbacks regarding all possible feedback allocations corresponding to RRC information indicating one or more possible signal-and-interference combinations and information about which feedback information is included.

TABLE 16

| Value of Aperiodic Feedback Indicator (Value of CSI request field) | Description |
|---|---|
| '0' | No Aperiodic Feedback is triggered |
| '1' | Aperiodic Feedback is triggered for All Feedback Allocations |

According to a second method for defining the 1-bit aperiodic feedback indicator, as shown in Table 17, if the aperiodic feedback is set to 'ON', the UE determines to perform aperiodic feedback for feedback allocations being set by separate RRC signaling among possible feedback allocations.

TABLE 17

| Value of Aperiodic Feedback Indicator (Value of CSI request field) | Description |
|---|---|
| '0' | No Aperiodic Feedback is triggered |
| '1' | Aperiodic Feedback is triggered for Feedback Allocations Being Configured by RRC |

According to the third method for defining the 1-bit aperiodic feedback indicator, as shown in Table 18, if the aperiodic feedback is set to 'ON', the UE determines to perform aperiodic feedback only for one feedback allocation, which is designated as a representative of possible feedback allocations. Herein, the feedback allocation designated as a representative may be a feedback having a lowest index or a feedback having a highest index among the possible feedback allocations allocated to the UE. As another example, the representative feedback allocation may be designated according to predefined rules or may be given from the Node B through predefined signaling means.

TABLE 18

| Value of Aperiodic Feedback Indicator (Value of CSI request field) | Description |
|---|---|
| '0' | No Aperiodic Feedback is triggered |
| '1' | Aperiodic Feedback is triggered for Single Feedback Allocation |

For a UE configured with a single CC, if the aperiodic feedback indicator is configured with two bits, the aperiodic feedback indicator may be defined in the following three methods.

According to a first method of defining the aperiodic feedback indicator, as shown in Table 19, if the aperiodic feedback indicator is set to '00' in a subframe #n, the UE determines not to perform aperiodic feedback; and if the aperiodic feedback indicator is set to '01', the UE determines to simultaneously transmit, in a subframe #(n+k), aperiodic feedbacks regarding all possible aperiodic feedback allocations corresponding to the RRC information indicating the possible signal-and-interference combination and information about which feedback information is included. If the aperiodic feedback indicator is set to '10' or '11', the UE performs aperiodic feedback for the aperiodic feedback allocations being set based on the RRC information for the corresponding aperiodic feedback indicator value.

TABLE 19

| Value of Aperiodic Feedback Indicator (Value of CSI request field) | Description |
|---|---|
| '00' | No Aperiodic Feedback is triggered |
| '01' | Aperiodic Feedback is triggered for All Feedback Allocations |
| '10' | Aperiodic Feedback is triggered for a First set of Feedback Allocations configured by RRC |
| '11' | Aperiodic Feedback is triggered for a Second set of Feedback Allocations configured by RRC |

According to a second method for defining the 2-bit aperiodic feedback indicator, as shown in Table 20, if the aperiodic feedback indicator is set to '00', the UE determines not to perform aperiodic feedback; and if the aperiodic feedback indicator is set to '01', '10', or '11', the UE performs aperiodic feedback for aperiodic feedback allocations being set based on RRC information for the corresponding aperiodic feedback indicator value.

TABLE 20

| Value of Aperiodic Feedback Indicator (Value of CSI request field) | Description |
|---|---|
| '00' | No Aperiodic Feedback is triggered |
| '01' | Aperiodic Feedback is triggered for a First set of Feedback Allocations configured by RRC |
| '10' | Aperiodic Feedback is triggered for a Second set of Feedback Allocations configured by RRC |
| '11' | Aperiodic Feedback is triggered for a Third set of Feedback Allocations configured by RRC |

According to a third method for defining the 2-bit aperiodic feedback indicator, as shown in Table 21, when the aperiodic feedback indicator is set to '00', the UE determines not to perform aperiodic feedback; and if the aperiodic feedback indicator is set to '01', the UE performs only aperiodic feedback for one feedback allocation designated as a representative among possible feedback allocations. Herein, the single feedback allocation designated as a representative may be a feedback having a lowest index or a feedback having a highest index among the possible feedback allocations allocated to the UE. However, if the aperiodic feedback indicator is set to '10' or '11', the UE performs aperiodic feedback for the aperiodic feedback allocation being set based on the RRC information for the corresponding aperiodic feedback indicator value.

TABLE 21

| Value of Aperiodic Feedback Indicator (Value of CSI request field) | Description |
|---|---|
| '00' | No Aperiodic Feedback is triggered |
| '01' | Aperiodic Feedback is triggered for Single Feedback Allocation |
| '10' | Aperiodic Feedback is triggered for a First set of Feedback Allocations configured by RRC |
| '11' | Aperiodic Feedback is triggered for a Second set of Feedback Allocations configured by RRC |

In definitions of the 1-bit or 2-bit aperiodic feedback indicator, Table 16, which shows a definition of the 1-bit aperiodic feedback indicator, and Table 19, which shows a definition of the 2-bit aperiodic feedback indicator have a definition 'Aperiodic Feedback is triggered for All Feedback Allocations' when the aperiodic feedback indicator is set to '1' and '01', respectively. The aperiodic feedback indicator values '1' and '01' of Table 17 and Table 20 have the same definition, and the aperiodic feedback indicator values '1' and '01' of Table 18 and Table 21 have the same definition. Thus, when using Table 16 for one bit, it may be desirable to use Table 19 for two bits. Likewise, it may be desirable to use Table 20 for Table 17 and Table 21 for Table 18.

Definitions of aperiodic feedback indicators in Table 16 and Table 19 are intended to allow a Node B to obtain an as large as possible amount of DL information through aperiodic feedback, and definitions of aperiodic feedback indicators in Table 17 and Table 20 improve the degree of freedom to allow a Node B to adjust aperiodic feedback configuration adaptively to situations. Definitions of aperiodic feedback indicators in Table 18 and Table 21 reduce the amount of aperiodic feedback to allow a Node B to obtain only important DL information.

When the simultaneous use of CA and CoMP is allowed, the 1-bit or 2-bit aperiodic feedback indicator may activate aperiodic feedback, taking account of several feedback allocations for several CCs and CoMP. In this case, the number of bits of the aperiodic feedback indicator is determined according to the number of CCs configured for the UE, the number of aperiodic feedback allocations being set for CoMP, and a type of a control channel in which DCI for UL scheduling is transmitted.

Figure 10:
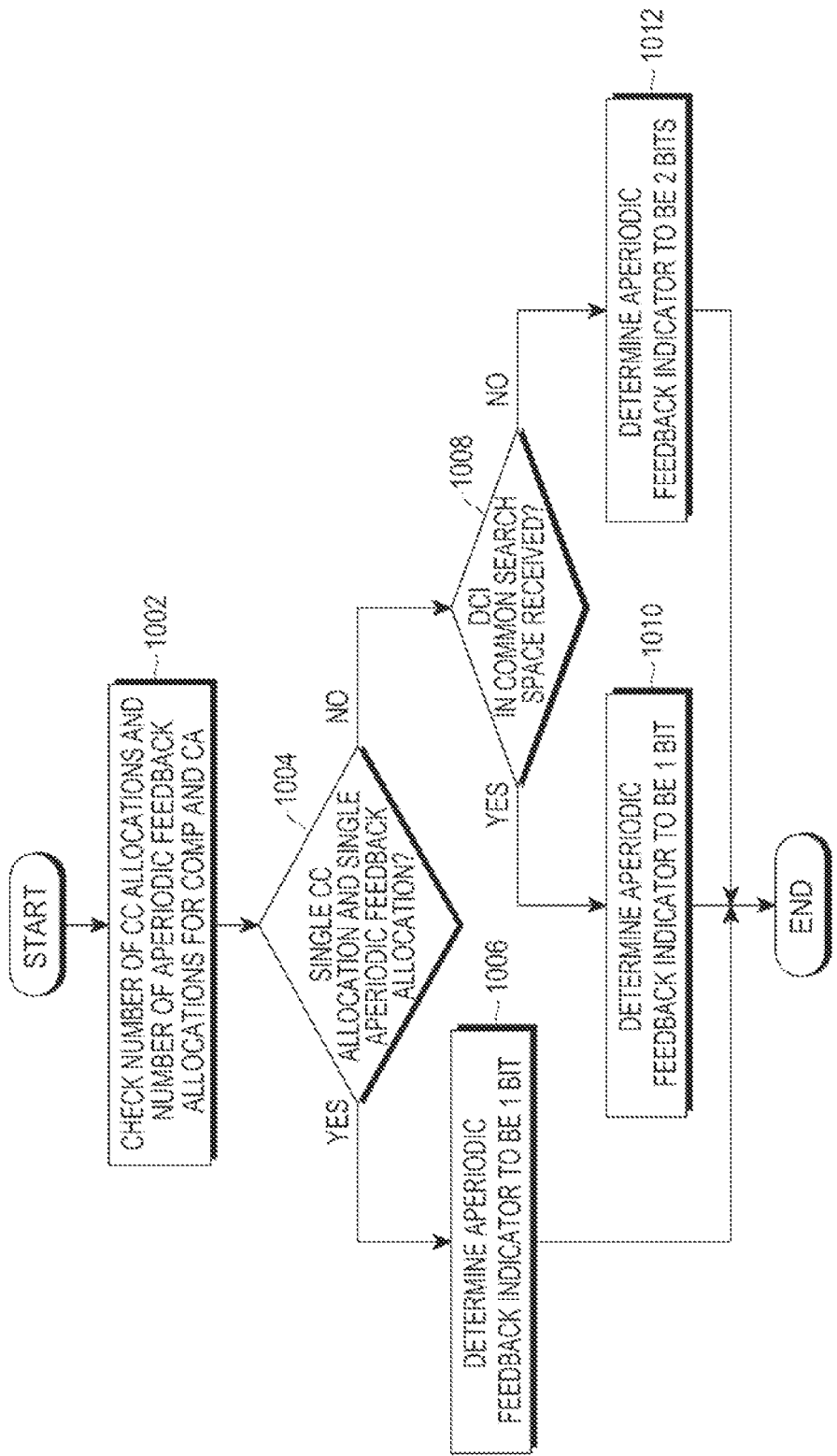
FIG. 10 is a flowchart illustrating a method of determining a number of bits of an aperiodic feedback indicator, when both CoMP and CA are simultaneously considered, according to an embodiment of the present invention.

FIG. 10 is a flowchart illustrating a method of determining a number of bits of an aperiodic feedback indicator, when both CoMP and CA are allowed, according to an embodiment of the present invention.

Referring to FIG. 10, in step 1002, a UE checks the number of CC allocations and the number of feedback allocations configured by RRC. In step 1004, the UE determines whether the number of CC allocations is 1 and the number of feedback allocations is 1, i.e., whether a single CC is allocated and a single feedback is allocated. For a single CC allocation and a single feedback allocation, the UE determines the aperiodic feedback indicator to be 1 bit and interprets the 1-bit aperiodic feedback indicator disposed in a particular position in DCI in step 1006.

However, if two or more CCs are allocated or two or more feedback allocations are allocated, i.e., in the case of multiple CC allocations or multiple feedback allocations, the UE determines whether to receive DCI in a common search space of a PDCCH or a UE-specific search space of the PDCCH, taking account of in which channel DCI for UL scheduling is transmitted, in step 1008. If determining to receive the DCI in the common search space, the UE determines the aperiodic feedback indicator to be 1 bit, in step 1010. However, if determining to receive UL DCI in the UE-specific search space, the UE determines the aperiodic feedback indicator to be 2 bits in step 1012.

For a UE allowed to simultaneously use CoMP and CA, if a periodic feedback indicator is configured with 1 bit, the aperiodic feedback indicator may be defined in the following three methods.

According to a first method of defining the aperiodic feedback indicator, as shown in Table 22, if an aperiodic feedback indicator is set to OFF ('0') in a subframe #n, the UE determines not to perform aperiodic feedback; and if the aperiodic feedback indicator is set to ON ('r'), the UE determines to simultaneously transmit, in a subframe #(n+k), aperiodic feedbacks regarding all possible feedback allocations corresponding to RRC information indicating one or more possible signal-and-interference combinations in "Serving cell c" and information about which feedback information is included. As described above, if an aperiodic feedback indicator is configured with 1 bit, "serving cell c" is a DL CC in which corresponding DCI is transmitted.

TABLE 22

| Value of Aperiodic Feedback Indicator (Value of CSI request field) | Description |
| --- | --- |
| '0' | No Aperiodic Feedback is triggered |
| '1' | Aperiodic Feedback is triggered for All Feedback Allocations in "Serving cell c" |

According to a second method for defining the 1-bit aperiodic feedback indicator, as shown in Table 23, if the aperiodic feedback indicator is set to ON, the UE determines to perform aperiodic feedback for feedback allocations being set through RRC signaling among possible feedback allocations in CCs configured by RRC.

TABLE 23

| Value of Aperiodic Feedback Indicator (Value of CSI request field) | Description |
| --- | --- |
| '0' | No Aperiodic Feedback is triggered |
| '1' | Aperiodic Feedback is triggered for Feedback Allocations in "serving cell c configured by RRC |

According to the third method for defining the 1-bit aperiodic feedback indicator, as shown in Table 24, if the aperiodic feedback indicator is set to ON, the UE determines to perform aperiodic feedback for one feedback allocation designated as a representative among possible feedback allocations in "Serving cell c". Herein, the single feedback allocation designated as a representative in "Serving cell c" may be a feedback having a lowest index or a feedback having a highest index among the possible feedback allocations allocated to the UE. As another example, the representative feedback allocation in "Serving cell c" may be designated according to predefined rules or may be given from the Node B through predefined signaling.

TABLE 24

| Value of Aperiodic Feedback Indicator (Value of CSI request field) | Description |
| --- | --- |
| '0' | No Aperiodic Feedback is triggered |
| '1' | Aperiodic Feedback is triggered for Single Feedback Allocation in "Serving cell c" |

For a UE allowed to simultaneously use CoMP and CA, if a periodic feedback indicator is configured with 2 bit, the aperiodic feedback indicator may be defined in the following three methods.

According to a first method of defining the aperiodic feedback indicator, as shown in Table 25, if an aperiodic feedback indicator is set to '00' in a subframe #n, the UE determines not to perform aperiodic feedback; and if the aperiodic feedback indicator is set to '01', the UE determines to simultaneously transmit, in a subframe #(n+k), aperiodic feedbacks regarding all possible aperiodic feedback allocations corresponding to RRC information indicating a possible signal-and-interference combination in "Serving cell c" and information about which feedback information is included. If the aperiodic feedback indicator is configured with 2 bits, "serving cell c" is a DL CC linked to an UL CC indicated by a CIF included in DCI for UL scheduling. If the aperiodic feedback indicator is set to '10' or '11', the UE performs aperiodic feedback for an aperiodic feedback allocation separately set based on RRC information in CCs configured based on RRC information for the corresponding aperiodic feedback indicator value.

TABLE 25

| Value of Aperiodic Feedback Indicator (Value of CSI request field) | Description |
| --- | --- |
| '00' | No Aperiodic Feedback is triggered |
| '01' | Aperiodic Feedback is triggered for All Feedback Allocations in "Serving cell c" |
| '10' | Aperiodic Feedback is triggered for a First set of Feedback Allocations in First CCs Configured by RRC |
| '11' | Aperiodic Feedback is triggered for a Second set of Feedback Allocations in Second CCs Configured by RRC |

When the simultaneous use of CA and CoMP is allowed, according to the second method for defining the 2-bit aperiodic feedback indicator, as shown in Table 26, if the aperiodic feedback indicator is set to '00', the UE determines not to perform aperiodic feedback; and if the aperiodic feedback indicator is set to '01', '10', or '11', the UE performs aperiodic feedback for an aperiodic feedback allocation being set based on RRC information in CCs configured based on RRC information for the corresponding aperiodic feedback indicator value.

TABLE 26

| Value of Aperiodic Feedback Indicator (Value of CSI request field) | Description |
| --- | --- |
| '00' | No Aperiodic Feedback is triggered |
| '01' | Aperiodic Feedback is triggered for a First set of Feedback Allocations in First CCs Configured by RRC |
| '10' | Aperiodic Feedback is triggered for a Second set of Feedback Allocations in Second CCs Configured by RRC |
| '11' | Aperiodic Feedback is triggered for a Third set of Feedback Allocations in Third CCs Configured by RRC |

When the simultaneous use of CA and CoMP is allowed, according to the third method for defining the 2-bits aperiodic feedback indicator, as shown in Table 27, if the aperiodic feedback indicator is set to '00', the UE determines not to perform aperiodic feedback; and if the aperiodic feedback indicator is set to '01', the UE performs aperiodic feedback for a single feedback allocation designated as a representative among possible feedback allocations in "Serving cell c". Herein, the feedback allocation designated as a representative may be a feedback having a lowest index or a feedback having a highest index among the possible feedback allocations allocated to the UE. However, if the aperiodic feedback indicator is set to '10' or '11', the UE performs aperiodic feedback for an aperiodic feedback allocation separately set based on RRC information in CCs configured based on RRC information for the corresponding aperiodic feedback indicator value.

TABLE 27

| Value of Aperiodic Feedback Indicator (Value of CSI request field) | Description |
| --- | --- |
| '00' | No Aperiodic Feedback is triggered |
| '01' | Aperiodic Feedback is triggered for Single Feedback Allocation in "Serving cell c" |
| '10' | Aperiodic Feedback is triggered for a First set of Feedback Allocations in First CCs Configured by RRC |
| '11' | Aperiodic Feedback is triggered for a Second set of Feedback Allocations in Second CCs Configured by RRC |

In definitions of the 1-bit or 2-bit aperiodic feedback indicator, Table 22, which shows a definition of the 1-bit aperiodic feedback indicator, and Table 25, which shows a definition of the 2-bit aperiodic feedback indicator, have a definition 'Aperiodic Feedback is triggered for All Feedback Allocations' when the aperiodic feedback indicator is set to '1' and '01', respectively. The aperiodic feedback indicator values '1' and '01' of Table 23 and Table 26 have equivalent definitions, and the aperiodic feedback indicator values '1' and '01' of Table 24 and Table 27 have the same definition. Thus, when using Table 22 for one bit, it may be desirable to use Table 25 for two bits. Likewise, it may be desirable to use Table 26 for Table 23 and Table 27 for Table 24.

Definitions of the aperiodic feedback indicator in Table 22 and Table 25 allow the Node B to obtain DL information for as many calls as possible through aperiodic feedback, while maximally using an aperiodic feedback method for a CA situation. Definitions of the aperiodic feedback indicator in Table 23 and Table 26 improve the degree of freedom to allow the Node B to adjust aperiodic feedback configuration adaptively to situations. Definitions of aperiodic feedback indicators in Table 12 and Table 15 reduce the amount of aperiodic feedback to allow the Node B to obtain only important DL information while maximally using an aperiodic feedback method for a CA situation.

Hereinafter, an embodiment of additional Fields for Multiple CSI Reports for Multiple TPs is described.

One of the new field for multiple CSI reports for multiple TPs is CCIF.

In a first optional embodiment, the CCIF indicates the aperiodic CSI report for a pre-defined CSI-RS configuration (or configurations). In one example, the feedback for a CSI-RS configuration has a lowest configuration index. In another example, the feedback for all CSI-RS configurations is in a CoMP measurement set.

In a second optional embodiment, the periodic CSI report feedback is triggered for best-m CSI-RS configurations, which are selected by a UE, where 'm' is integer value from 1 to the size of CoMP measurement set, which could be configured by higher layer.

In a third optional embodiment, the aperiodic CSI report is triggered for a pre-defined set of CSI-RS configurations configured by higher layer.

The RRC signaling may send a CSI-RS-Configuration-Indicator-Presence field indicating whether CSI-RS configuration indicator field is present or not. When CSI-RS-Configuration-Indicator-Presence is disabled, aperiodic CSI report based on the pre-defined CSI-RS configuration(s) could be triggered.

In one example, the aperiodic CSI report is triggered for all CSI-RS configurations in CoMP measurement set. Whether CSI-RS configuration indicator field is present or not for CoMP feedback can be dependent on at least one of the following parameters (without the above RRC signaling that indicates CSI-RS-Configuration-Indicator-Presence):

Number of non-zero-power CSI-RS resources configured by eNB

Number of interference assumptions configured by eNB

Number of feedback configurations indicated by eNB

An Optional Aperiodic-CSI-RS-Configuration-Trigger field is signaled for indicating for which CSI-RS configurations the aperiodic CSI report is triggered when one or more CSI-RS configurations are configured. This field can be defined for each serving cell (configurable for each CC).

Two different sets from RRC signaling are referred for CA and CoMP. One set is for the CA, and each CC is called as 'serving cell'. The aperiodic CSI report may be triggered for a 1st set of serving cells configured by higher layers. Another set is for the CoMP. The CSI feedback report for each TP for CoMP is corresponding to the set of CSI-RS configuration in CoMP measurement set. The aperiodic CSI report may be triggered for a 1st set of CSI-RS configurations (in CoMP measurement set) configured by higher layers.

A CSI-RS configuration Indicator is not needed when UL PUSCH scheduling (not for aperiodic CSI report). When a CSI report request field is zero, CCIF can be used for different purpose, in example, Radio Resource Management (RRM) or Reference Signal Received (RSRP) measurement triggering. The CoMP measurement set for an aperiodic CSI report can be different from CoMP measurement set for periodic CSI report.

Tables 28 to 30 shows examples of a CSI-RS configuration indicator field (1 bit case) without RRC signaling.

TABLE 28

| Value of CCIF | Description |
|---|---|
| '0' | Aperiodic CSI report is triggered for single CSI-RS configuration |
| '1' | Aperiodic CSI report is triggered for all CSI-RS configurations in CoMP measurement set |

TABLE 29

| Value of CCIF | Description |
|---|---|
| '0' | Aperiodic CSI report is triggered for best-m CSI-RS configurations which are selected by UE |
| '1' | Aperiodic CSI report is triggered for all CSI-RS configurations in CoMP measurement set |

TABLE 30

| Value of CCIF | Description |
|---|---|
| '0' | Aperiodic CSI report is triggered for single CSI-RS configuration |
| '1' | Aperiodic CSI report is triggered for best-m CSI-RS configurations which is selected by UE |

Tables 31 to 33 show examples of a CSI-RS configuration indicator field (1 bit case) using Aperiodic-CSI-RS-Configuration-Trigger.

TABLE 31

| Value of CCIF | Description |
|---|---|
| '0' | Aperiodic CSI report is triggered for a $1^{st}$ set of CSI-RS Configurations configured by higher layers |
| '1' | Aperiodic CSI report is triggered for a $2^{nd}$ set of CSI-RS Configurations configured by higher layers |

TABLE 32

| Value of CCIF | Description |
|---|---|
| '0' | Aperiodic CSI report is triggered for best-m CSI-RS configurations which are selected by UE |
| '1' | Aperiodic CSI report is triggered for all CSI-RS configurations in CoMP measurement set |

TABLE 33

| Value of CCIF | Description |
|---|---|
| '0' | Aperiodic CSI report is triggered for best-m CSI-RS configurations which are selected by UE |
| '1' | Aperiodic CSI report is triggered for a 1-st set of CSI-RS configurations configured by higher layers |

Table 34 shows an example of a CSI-RS configuration indicator field (2 bits case) without RRC signaling.

TABLE 34

| Value of CCIF | Description |
|---|---|
| '00' | Aperiodic CSI report is triggered for a 1-st set of CSI-RS Configurations configured by higher layers |
| '01' | Aperiodic CSI report is triggered for a 2-nd set of CSI-RS Configurations configured by higher layers |
| '10' | Aperiodic CSI report is triggered for a 3-rd set of CSI-RS Configurations configured by higher layers |
| '11' | Aperiodic CSI report is triggered for a 4-th set of CSI-RS Configurations configured by higher layers |

Tables 35 and 36 show examples of a CSI-RS configuration indicator field (2 bits case) using Aperiodic-CSI-RS-Configuration-Trigger

TABLE 35

| Value of CCIF | Description |
|---|---|
| '00' | Aperiodic CSI report is triggered for single CSI-RS configuration |
| '01' | Aperiodic CSI report is triggered for all CSI-RS configurations in CoMP measurement set |
| '10' | Aperiodic CSI report is triggered for a $1^{st}$ set of CSI-RS Configurations configured by higher layers |
| '11' | Aperiodic CSI report is triggered for a $2^{nd}$ set of CSI-RS Configurations configured by higher layers |

TABLE 36

| Value of CCIF | Description |
|---|---|
| '00' | Aperiodic CSI report is triggered for single CSI-RS configuration |
| '01' | Aperiodic CSI report is triggered for best-m CSI-RS configurations which are selected by UE |
| '10' | Aperiodic CSI report is triggered for best-m' CSI-RS configurations which are selected by UE |
| '11' | Aperiodic CSI report is triggered for all CSI-RS configurations in CoMP measurement set |

Tables 37 and 38 show a CSI-RS configuration indicator field (3 bits case) using an Aperiodic-CSI-RS-Configuration-Trigger.

TABLE 37

| Value of CCIF | Description |
|---|---|
| '000' | Aperiodic CSI report is triggered for a 1$^{st}$ set of CSI-RS Configurations configured by higher layers |
| '001' | Aperiodic CSI report is triggered for a 2$^{nd}$ set of CSI-RS Configurations configured by higher layers |
| '010' | Aperiodic CSI report is triggered for a 3$^{rd}$ set of CSI-RS Configurations configured by higher layers |
| '011' | Aperiodic CSI report is triggered for a 4$^{th}$ set of CSI-RS Configurations configured by higher layers |
| '100' | Aperiodic CSI report is triggered for a 5$^{th}$ set of CSI-RS Configurations configured by higher layers |
| '101' | Aperiodic CSI report is triggered for a 6$^{th}$ set of CSI-RS Configurations configured by higher layers |
| '110' | Aperiodic CSI report is triggered for a 7$^{th}$ set of CSI-RS Configurations configured by higher layers |
| '111' | Aperiodic CSI report is triggered for a 8$^{th}$ set of CSI-RS Configurations configured by higher layers |

TABLE 38

| Value of CCIF | Description |
|---|---|
| '000' | Aperiodic CSI report is triggered for single CSI-RS configuration |
| '001' | Aperiodic CSI report is triggered for best-m CSI-RS configurations which are selected by UE |
| '010' | Aperiodic CSI report is triggered for best-m' CSI-RS configurations which are selected by UE |
| '011' | Aperiodic CSI report is triggered for all CSI-RS configurations in CoMP measurement set |
| '100' | Aperiodic CSI report is triggered for a 1$^{st}$ set of CSI-RS Configurations configured by higher layers |
| '101' | Aperiodic CSI report is triggered for a 2$^{nd}$ set of CSI-RS Configurations configured by higher layers |
| '110' | Aperiodic CSI report is triggered for a 3$^{rd}$ set of CSI-RS Configurations configured by higher layers |
| '111' | Aperiodic CSI report is triggered for a 4$^{th}$ set of CSI-RS Configurations configured by higher layers |

The CSI-RS configuration indicator field without RRC signaling may have a bit-map type of predefined CSI-RS reporting set, e.g., 3 bits, as shown below.

[CSIRS1,CSIRS2,CSIRS3]=[000]~[111]

The leftmost bit 0 in the bit string corresponds to the CSI-RS configuration with CSIRS_Configuration_Index=0 in CoMP measurement set. Each bit has either a value 0, which means no aperiodic CSI report for corresponding CSI-RS configuration is triggered or a value 1, which means the aperiodic CSI report for corresponding CSI-RS configuration is triggered. The CoMP measurement set size is less than or equal to 3 in this case. The bit map size could be configurable. The size of CCIF could be configured by higher layer signaling.

The CIF can be used instead of adding a new CCIF. The CIF may be 3 bits as shown in Table 39, wherein the CIF from 000 to 100 are used for 5 CCs, and the CIF from 101 to 111 are not dedicated. This un-defined (or un-dedicated) bit allocation can be used to feedback information for CoMP. Single CC transmission may be assumed when CoMP feedback is triggered. When CC for PUSCH is pre-defined (e.g., a lowest ServCellIndex, which refers to an index of the serving cell)), or defined in higher layer signaling.

TABLE 39

| Value of CIF | Description |
|---|---|
| '000'~'100' | Legacy CIF |
| '101' | Aperiodic CSI report is triggered for best-m CSI-RS configurations which are selected by UE |
| '110' | Aperiodic CSI report is triggered for all CSI-RS configurations in CoMP measurement set |
| '111' | Aperiodic CSI report is triggered for a 1$^{st}$ set of CSI-RS Configurations configured by higher layers |

The RRC signaling may send an optional Aperiodic-CSI-RS-Configuration-Trigger field indicating for which CSI-RS configurations the aperiodic CSI report is triggered when one or more CSI-RS configurations are configured. This field can include the carrier indicator information, which is a scheduling CC for UL PUSCH. Two different sets from RRC signaling are referred for CA and CoMP. One set is for the CA, and each CC is called as a serving cell. The aperiodic CSI report may be triggered for a 1st set of serving cells configured by higher layers.

Another set is for the CoMP, and CSI feedback report for each TP for CoMP corresponds to the set of CSI-RS configuration in CoMP measurement set. The aperiodic CSI report may be triggered for a 1st set of CSI-RS configurations (in CoMP measurement set) configured by higher layers.

To reduce resource inefficiency, a CIF field is inserted to a portion that is not used in a CA for a DCI format of the 3GPP Release 10.

Figure 11:
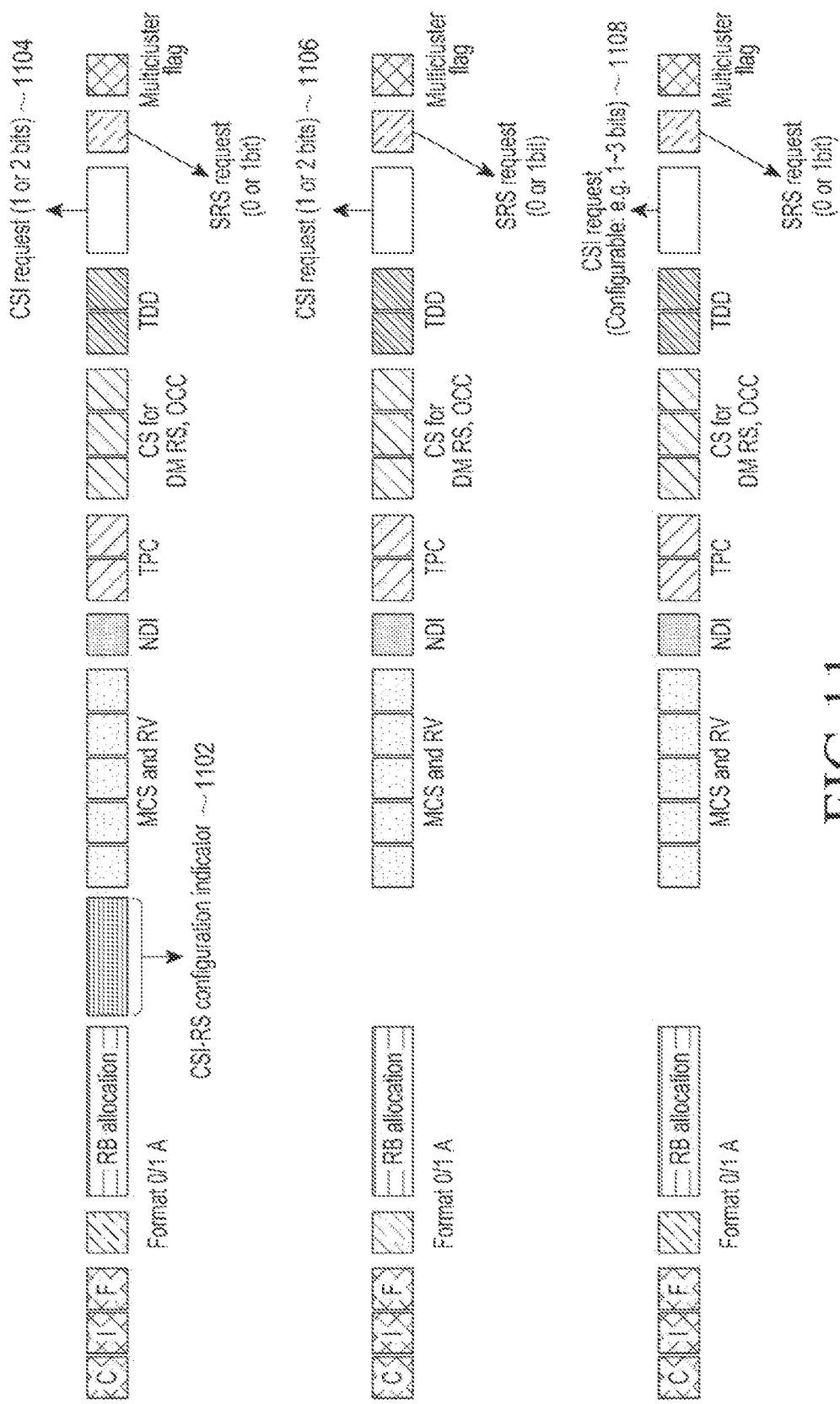
FIGS. 11 to 13 illustrate examples of DCI format according to embodiments of the present invention.

FIG. 11 illustrates an example of a DCI format according to an embodiment of the present invention.

Referring to FIG. 11, the DCI format includes a CIF, a Flag Format field, a Resource Block (RB) allocation field, an optional CSI-RS configuration indicator (1102), at least one Modulation and Coding Scheme (MCS) and Redundancy Version (RV) field, a New Data Indicator (NDI), a Transmit Power Control (TPC) command, a Cyclic Shift (CS) for Demodulation Reference Signal (DMRS) and Orthogonal Cover Code (OCC) index, a TDD configuration field for TDD only, a CSI request field (1104, 1106, 1108), a Sounding Reference Signal (SRS) request field, and a Multi-cluster flag. The CSI request field (1104, 1106, 1108) may configurable to 1, 2, or 3 bits.

For DS/DB, a UE may generate CSI for multiple interference assumptions (e.g., with and without blanking). In the followings examples of calculating CSI report for DS/DB, the eNB indicates which TP is possible for blanking (B-TP).

feedback set={TP-1, TP-2, TP-3}, B-TP=TP-1.

The UE may generate 5 CSI as follows:
1-st CSI for TP-1 without blanking
2-nd and 3-rd CSI for TP-2 with and without blanking of TP-1, respectively
4-th and 5-th CSI for TP-3 with and without blanking of TP-1, respectively When IMR is used, the eNB may allocate, to the UE, two interference measurement resources (with and without blanking of B-TP) with each CSI-RS configuration for signal. For each CSI-RS configuration, the UE generates two CSI corresponding to the two interference measurement resources. If an eNB allocates only one interference measurement resource with a CSI-RS configuration, the CSI-RS configuration may be for a B-TP.

For a CSI report for DB, some additional CSI report is calculated conditioned on a DS/DB assumption (multiple interference assumptions), as shown above. For a CSI report for multiple points, the aperiodic CSI report is triggered for all CSI-RS configurations in a CoMP measurement set. For a CSI report for DB, the aperiodic additional CSI report (for DB) is triggered for all CSI-RS configurations in a CoMP measurement set.

Additionally, the CSI Request Field may be used instead of adding a new CCIF. For example, the CSI Request Field may reuse CSI Request Field with a modified description or increase the size of the CSI Request Field to include feedback information for CoMP.

The optional Additional CSI Request (A-CSI) field may indicate that the aperiodic-CSI-RS-Configuration-Trigger information includes a CSI report for DB. The UE can have CSI feedback and additional CSI feedback for DB for corresponding CSI configuration, without the A-CSI field (e.g., this could be the baseline of CSI feedback for CoMP). The A-CSI Request field can be 1 bit, and if set to 1, then additional CSI feedbacks for DS/CB are generated on the top of CSI report for CSI-RS configuration.

The RRC signaling sends CSI-RS-Configuration-Indicator-Presence indicating whether an updated CSI Request field is used or not. This field can include the condition as to whether A-CSI field is present or not. Otherwise, there would be new RRC signaling of 'A-CSI-Request-Presence' field for A-CSI request field.

When CSI-RS-Configuration-Indicator-Presence is disabled, an aperiodic CSI report based on the pre-defined CSI-RS configuration(s) can be triggered. For example, the aperiodic CSI report may be triggered for all CSI-RS configurations in a CoMP measurement set, and the additional aperiodic CSI report (for DB) is triggered for all CSI-RS configurations in CoMP measurement set.

Whether an updated CSI Request field is used for CoMP feedback or not can be dependent on at least one of (1) the number of non-zero-power CSI-RS resources configured by eNB, (2) the number of interference assumptions configured by eNB, and (3) the number of feedback configurations indicated by eNB, without the above RRC signaled CSI-RS-Configuration-Indicator-Presence.

The optional Aperiodic-CSI-RS-Configuration-Trigger field indicates for which CSI-RS configurations the aperiodic CSI report is triggered, when one or more CSI-RS configurations are configured. This field can be defined for each serving cell (or CC). Two different sets from RRC signaling are referred for CA and CoMP. One set is for the CA, and each CC is called a serving cell. The aperiodic CSI report may be triggered for a 1st set of serving cells configured by higher layers.

Another set is for the CoMP and CSI feedback report for each TP for CoMP corresponds to the set of CSI-RS configuration in CoMP measurement set. The aperiodic CSI report may be triggered for a 1st set of CSI-RS configurations (in CoMP measurement set) configured by higher layers.

To reduce resource inefficiency, instead of using fixed bits for a CCIF, when a CSI reporting field is set to zero, the CoMP measurement set for aperiodic CSI report can be different from a CoMP measurement set for a periodic CSI report.

Tables 40 to 43 show examples of a new CSI Request field, when a conventional CSI Request field is 1 bit, a new CSI Request field is 1 bit, and the Additional CSI Request field for DB is set to 1. In addition to a CSI report for corresponding CSI-RS configurations, a CSI report for DB for corresponding CSI-RS configurations is triggered.

TABLE 40

| Value of CSI request field | Description |
| --- | --- |
| '0' | No aperiodic CSI report is triggered |
| '1' | Aperiodic CSI report is triggered for single CSI-RS configurations in CoMP measurement set |

TABLE 41

| Value of CSI request field | Description |
| --- | --- |
| '0' | No aperiodic CSI report is triggered |
| '1' | Aperiodic CSI report is triggered for best-m CSI-RS configurations in CoMP measurement set |

TABLE 42

| Value of CSI request field | Description |
| --- | --- |
| '0' | No aperiodic CSI report is triggered |
| '1' | Aperiodic CSI report is triggered for all CSI-RS configurations in CoMP measurement set |

TABLE 43

| Value of CSI request field | Description |
| --- | --- |
| '0' | No aperiodic CSI report is triggered |
| '1' | Aperiodic CSI report is triggered for a $1^{st}$ set of CSI-RS Configurations configured by higher layers |

Tables 44 to 47 show descriptions of a new CSI Request field, when a conventional CSI Request field is 1 bit, a new CSI Request field is 1 bit, and an A-CSI field does not exist.

TABLE 44

| Value of CSI request field | Description |
| --- | --- |
| '0' | No aperiodic CSI report is triggered |
| '1' | Aperiodic CSI report is triggered for single CSI-RS configuration, and aperiodic additional CSI report (for DB) is triggered for single CSI-RS configuration |

TABLE 45

| Value of CSI request field | Description |
| --- | --- |
| '0' | No aperiodic CSI report is triggered |
| '1' | Aperiodic CSI report is triggered for best-m CSI-RS configurations which are selected by UE, and aperiodic additional CSI report (for DB) is triggered for best-m CSI-RS configurations which are selected by UE |

TABLE 46

| Value of CSI request field | Description |
| --- | --- |
| '0' | No aperiodic CSI report is triggered |
| '1' | Aperiodic CSI report is triggered for all CSI-RS configurations in CoMP measurement set, and aperiodic additional CSI report (for DB) is triggered for all CSI-RS configurations in a CoMP measurement set |

TABLE 47

| Value of CSI request field | Description |
| --- | --- |
| '0' | No aperiodic CSI report is triggered |
| '1' | Aperiodic CSI report is triggered for a 1-st set of CSI-RS configurations configured by higher layers, and aperiodic additional CSI report (for DB) is triggered for a 1-st set of CSI-RS configurations configured by higher layers |

Tables 48 to 49 show descriptions of a new CSI Request field, when a conventional CSI Request field is 1 bit, a new CSI Request field is 2 bits, and an Additional CSI Request field for DB is set to 1. In addition to a CSI report for corresponding CSI-RS configurations, a CSI report for DB for corresponding to CSI-RS configurations is triggered.

TABLE 48

| Value of CSI request field | Description |
| --- | --- |
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE |
| '11' | Aperiodic CSI report is triggered for all CSI-RS configurations in CoMP measurement set |

TABLE 49

| Value of CSI request field | Description |
| --- | --- |
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE |
| '11' | Aperiodic CSI report is triggered for a 1-st set of CSI-RS configurations configured by higher layers |

Tables 50 and 51 show descriptions of a new CSI Request field, when a conventional CSI Request field is 1 bit, the new CSI Request field is 2 bits, and an A-CSI field does not exist.

TABLE 50

| Value of CSI request field | Description |
| --- | --- |
| '00' | No aperiodic CSI report is triggered |
| '01' | Aperiodic CSI report is triggered for single CSI-RS configuration |
| '10' | Aperiodic CSI report is triggered for single CSI-RS configuration, and aperiodic additional CSI report (for DB) is triggered for single CSI-RS configuration |
| '11' | Aperiodic CSI report is triggered for all CSI-RS configurations in CoMP measurement set, and aperiodic additional CSI report (for DB) is triggered for all CSI-RS configurations in CoMP measurement set |

TABLE 51

| Value of CSI request field | Description |
| --- | --- |
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE, and aperiodic additional CSI report (for DB) is triggered for best-m CSI-RS configurations which are selected by UE |
| '11' | Aperiodic CSI report is triggered for a 1-st set of CSI-RS configurations configured by higher layers, and aperiodic additional CSI report (for DB) is triggered for a 1-st set of CSI-RS configurations configured by higher layers |

Tables 52 and 53 show descriptions of a new CSI request field, when a conventional CSI Request field is 1 bit, the new CSI Request field is 2 bits, and an A-CSI field does not exist.

TABLE 52

| Value of CSI request field | Description |
| --- | --- |
| '00' | No aperiodic CSI report is triggered |
| '01' | Aperiodic CSI report is triggered for all CSI-RS configurations in CoMP measurement set |
| '10' | Aperiodic additional CSI report (for DB) is triggered for all CSI-RS configurations in CoMP measurement set |
| '11' | Aperiodic CSI report is triggered for all CSI-RS configurations in CoMP measurement set, and aperiodic additional CSI report (for DB) is triggered for all CSI-RS configurations in CoMP measurement set |

TABLE 53

| Value of CSI request field | Description |
| --- | --- |
| '00' | No aperiodic CSI report is triggered |
| '01' | Aperiodic CSI report is triggered for a 1-st set of CSI-RS configurations configured by higher layers |
| '10' | Aperiodic additional CSI report (for DB) is triggered for a 1-st set of CSI-RS configurations configured by higher layers |
| '11' | Aperiodic CSI report is triggered for a 1-st set of CSI-RS configurations configured by higher layers, and aperiodic additional CSI report (for DB) is triggered for a 1-st set of CSI-RS configurations configured by higher layers |

Tables 54 and 55 show descriptions of a new CSI request field, when a conventional CSI Request field is 2 bits, the new CSI Request field is 2 bits, and an Additional CSI Request field for DB is set to 1. In addition to a CSI report for corresponding CSI-RS configurations, a CSI report for DB for corresponding CSI-RS configurations is triggered.

TABLE 54

| Value of CSI request field | Description |
| --- | --- |
| '00' | No aperiodic CSI report is triggered |
| '01' | Aperiodic CSI report is triggered for all CSI-RS configurations in CoMP measurement set for serving cell c |
| '10' | Aperiodic additional CSI report is triggered for a 1-st set of CSI-RS configurations and a 1-st set of serving cells configured by higher layers |
| '11' | Aperiodic CSI report is triggered for a 2-nd set of CSI-RS configurations and a 2-nd set of serving cells configured by higher layers |

TABLE 55

| Value of CSI request field | Description |
| --- | --- |
| '00' | No aperiodic CSI report is triggered |
| '01' | Aperiodic CSI report is triggered for best-m CSI-RS configurations in CoMP measurement set for serving cell c |
| '10' | Aperiodic additional CSI report is triggered for a 1-st set of CSI-RS configurations and a 1-st set of serving cells configured by higher layers |
| '11' | Aperiodic CSI report is triggered for a 2-nd set of CSI-RS configurations and a 2-nd set of serving cells configured by higher layers |

Tables 56 and 57 show descriptions of a new CSI request field, when a conventional CSI Request field is 2 bits, the new CSI Request field is 2 bits, and an A-CSI field does not exist.

TABLE 56

| Value of CSI request field | Description |
| --- | --- |
| '00' | No aperiodic CSI report is triggered |
| '01' | Aperiodic CSI report is triggered for all CSI-RS configurations in CoMP measurement set for serving cell c |
| '10' | Aperiodic additional CSI report is triggered for a 1-st set of CSI-RS configurations and a 1-st set of serving cells configured by higher layers, and aperiodic additional CSI report (for DB) is triggered for a 1-st set of CSI-RS configurations and a 1-st set of serving cells configured by higher layers |
| '11' | Aperiodic additional CSI report is triggered for a 2-nd set of CSI-RS configurations and a 2-nd set of serving cells configured by higher layers, and aperiodic additional CSI report (for DB) is triggered for a 2-nd set of CSI-RS configurations and a 2-nd set of serving cells configured by higher layers |

TABLE 57

| Value of CSI request field | Description |
| --- | --- |
| '00' | No aperiodic CSI report is triggered |
| '01' | Aperiodic CSI report is triggered for all CSI-RS configurations in CoMP measurement set for serving cell c |
| '10' | Aperiodic additional CSI report is triggered for a 1-st set of CSI-RS configurations and a 1-st set of serving cells configured by higher layers |
| '11' | Aperiodic additional CSI report (for DB) is triggered for a 1-st set of CSI-RS configurations and a 1-st set of serving cells configured by higher layers |

Table 58 shows descriptions of a new CSI request field, when a conventional CSI Request field is 2 bits, the new CSI Request field is 3 bits, and an Additional CSI Request field for DB is set to 1. In addition to CSI report for corresponding CSI-RS configurations, a CSI report for DB for corresponding CSI-RS configurations is triggered.

TABLE 58

| Value of CSI request field | Description |
| --- | --- |
| '000' | No aperiodic CSI report is triggered |
| '001' | Aperiodic CSI report is triggered for single CSI-RS Configuration in CoMP measurement set for serving cell c |
| '010' | Aperiodic CSI report is triggered for single CSI-RS Configuration and a 1-st set of serving cells configured by higher layers |
| '011' | Aperiodic CSI report is triggered for single CSI-RS Configuration and a 2-nd set of serving cells configured by higher layers |
| '100' | Aperiodic CSI report is triggered for best-m CSI-RS Configurations which are selected by UE for serving cell c |
| '101' | Aperiodic CSI report is triggered for all CSI-RS Configurations in CoMP measurement set for serving cell c |
| '110' | Aperiodic CSI report is triggered for a 1-st set of CSI-RS Configurations and a 1-st set of serving cells configured by higher layers |
| '111' | Aperiodic CSI report is triggered for a 2-nd set of CSI-RS Configurations and a 2-nd set of serving cells configured by higher layers |

Tables 59 and 60 show descriptions of s new CSI request field, when a conventional CSI Request field is 2 bits, the new CSI Request field is 3 bits, and an A-CSI field does not exist.

TABLE 59

| Value of CSI request field | Description |
| --- | --- |
| '000' | No aperiodic CSI report is triggered |
| '001' | Aperiodic CSI report is triggered for all CSI-RS Configurations in CoMP measurement set for serving cell c |
| '010' | Aperiodic CSI report is triggered for all CSI-RS Configurations and a 1-st set of serving cells configured by higher layers |
| '011' | Aperiodic CSI report is triggered for all CSI-RS Configurations and a 2-nd set of serving cells configured by higher layers |
| '100' | Aperiodic CSI report is triggered for best-m CSI-RS Configurations which are selected by UE for serving cell c |
| '101' | Aperiodic CSI report is triggered for all CSI-RS Configurations in CoMP measurement set for serving cell c, and aperiodic additional CSI report (for DB) is triggered for all CSI-RS configurations in CoMP measurement set for serving cell c |
| '110' | Aperiodic CSI report is triggered for a 1-st set of CSI-RS Configurations and a 1-st set of serving cells configured by higher layers, and aperiodic additional CSI report (for DB) is triggered for a 1-st set of CSI-RS configurations and a 1-st set of serving cells configured by higher layers |
| '111' | Aperiodic CSI report is triggered for a 2-nd set of CSI-RS Configurations and a 2-nd set of serving cells configured by higher layers, and aperiodic additional CSI report (for DB) is triggered for a 2-nd set of CSI-RS configurations and a 2-nd set of serving cells configured by higher layers |

TABLE 60

| Value of CSI request field | Description |
| --- | --- |
| '000' | No aperiodic CSI report is triggered |
| '001' | Aperiodic CSI report is triggered for single CSI-RS Configuration in CoMP measurement set for serving cell c |
| '010' | Aperiodic CSI report is triggered for single CSI-RS Configuration and a 1-st set of serving cells configured by higher layers |
| '011' | Aperiodic CSI report is triggered for single CSI-RS Configuration and a 2-nd set of serving cells configured by higher layers |
| '100' | Aperiodic CSI report is triggered for all CSI-RS Configurations in CoMP measurement set for serving cell c |
| '101' | Aperiodic additional CSI report (for DB) is triggered for all CSI-RS configurations in CoMP measurement set for serving cell c |
| '110' | Aperiodic CSI report is triggered for a 1-st set of CSI-RS Configurations and a 1-st set of serving cells configured by higher layers, and aperiodic additional CSI report (for DB) is triggered for a 1-st set of CSI-RS configurations and a 1-st set of serving cells configured by higher layers |
| '111' | Aperiodic CSI report is triggered for a 2-nd set of CSI-RS Configurations and a 2-nd set of serving cells configured by higher layers, and aperiodic additional CSI report (for DB) is triggered for a 2-nd set of CSI-RS configurations and a 2-nd set of serving cells configured by higher layers |

A new field for multiple CSI reports for multiple TPs is the CCIF.

In a first optional embodiment, the CCIF indicates the aperiodic CSI report for a pre-defined CSI-RS configuration (or configurations). In one example, the feedback for a CSI-RS configuration that has a lowest configuration index is indicated. In another example, the feedback for all CSI-RS configurations in a CoMP measurement set is indicated.

In a second optional embodiment, the aperiodic CSI report feedback is triggered for best-m CSI-RS configurations, which are selected by UE, where 'm' is integer value from 1 to the size of CoMP measurement set, which is configured by a higher layer.

In a third optional embodiment, the aperiodic CSI report is triggered for a pre-defined set of CSI-RS configurations configured by higher layer. On the top of an aperiodic CSI report for multiple CSI-RS configurations, a UE generates a CSI report for DB based on corresponding CSI-RS configurations, when A-CSI Request is set to 1.

The A-CSI field may be an optional field to indicate that Aperiodic-CSI-RS-Configuration-Trigger information might include CSI report for DB. The UE can always have CSI feedback and additional CSI feedback for DB for corresponding CSI configuration without A-CSI field (e.g., this could be the baseline of CSI feedback for CoMP). The A-CSI Request field can be 1 bit, and when set to 1, the additional CSI feedbacks for DB are generated based on the CCIF.

The RRC signaling sends a CSI-RS-Configuration-Indicator-Presence field indicating whether a CSI-RS configuration indicator field is present or not. This field can include a condition as to whether an A-CSI field is present or not. Otherwise, there would be new RRC signaling of 'A-CSI-Request-Presence' field for A-CSI request field.

When CSI-RS-Configuration-Indicator-Presence is disabled, an aperiodic CSI report based on the pre-defined CSI-RS configuration(s) can be triggered. For example, the aperiodic CSI report is triggered for all CSI-RS configurations in CoMP measurement set, and an aperiodic additional CSI report (for DB) is triggered for all CSI-RS configurations in a CoMP measurement set.

Whether a CSI-RS configuration indicator field is present CoMP feedback or not for can be dependent on at least one of the following parameters (without the above RRC signaling CSI-RS-Configuration-Indicator-Presence):

Number of non-zero-power CSI-RS resources configured by eNB

Number of interference assumptions configured by eNB

Number of feedback configurations indicated by eNB

The optional Aperiodic-CSI-RS-Configuration-Trigger field indicates for which CSI-RS configurations the aperiodic CSI report is triggered when one or more CSI-RS configurations are configured. This field can be defined for each serving cell (or CC).

Two different sets from RRC signaling are referred for CA and CoMP. One set is for the CA, each CC is called a serving cell. In one example, the aperiodic CSI report is triggered for a 1st set of serving cells configured by higher layers.

Another set is for the CoMP, and a CSI feedback report for each TP for CoMP corresponds to the set of CSI-RS configurations in a CoMP measurement set. For example, the aperiodic CSI report is triggered for a 1st set of CSI-RS configurations (in CoMP measurement set) configured by higher layers.

The CCIF and the A-CSI are not used for UL PUSCH scheduling (not for aperiodic CSI report). When CSI report request field is zero, a CCIF/A-CSI can be used for different purpose, e.g., RRM (RSRP) measurement triggering. CoMP measurement set for aperiodic CSI report can be different from CoMP measurement set for periodic CSI report.

Table 61 shows an example of a CSI-RS configuration indicator field (1 bit case) without RRC signaling, when an Additional CSI Request field for DB is set to 1. In addition to a CSI report for corresponding CSI-RS configurations, a CSI report for DB for corresponding CSI-RS configurations is triggered.

TABLE 61

| Value of CCIF | Description |
| --- | --- |
| '0' | Aperiodic CSI report is triggered for single CSI-RS configuration |
| '1' | Aperiodic CSI report is triggered for all CSI-RS configurations in CoMP measurement set |

Tables 62 to 64 show examples of a CSI-RS configuration indicator field (1 bit case) without RRC signaling, when an A-CSI field does not exist.

TABLE 62

| Value of CCIF | Description |
| --- | --- |
| '0' | Aperiodic CSI report is triggered for single CSI-RS configuration |
| '1' | Aperiodic CSI report is triggered for single CSI-RS configuration, and aperiodic additional CSI report (for DB) is triggered for single CSI-RS configuration |

TABLE 63

| Value of CCIF | Description |
| --- | --- |
| '0' | Aperiodic CSI report is triggered for all CSI-RS configurations in CoMP measurement set |
| '1' | Aperiodic CSI report is triggered for all CSI-RS |

TABLE 63-continued

| Value of CCIF | Description |
|---|---|
| | configurations in CoMP measurement set, and aperiodic additional CSI report (for DB) is triggered for all CSI-RS configurations in CoMP measurement set |

TABLE 64

| Value of CCIF | Description |
|---|---|
| '0' | Aperiodic CSI report is triggered for best-m CSI-RS configurations which are selected by UE |
| '1' | Aperiodic CSI report is triggered for best-m CSI-RS configurations which are selected by UE, and aperiodic additional CSI report is triggered (for DB) for best-m CSI-RS configurations which are selected by UE |

Tables 65 to 67 shows examples of a CSI-RS configuration indicator field (1 bit case) without RRC signaling, when an A-CSI field does not exist.

TABLE 65

| Value of CCIF | Description |
|---|---|
| '0' | Aperiodic additional CSI report (for DB) is triggered for all CSI-RS configurations in CoMP measurement set |
| '1' | Aperiodic CSI report is triggered for all CSI-RS configurations in CoMP measurement set, and aperiodic additional CSI report (for DB) is triggered for all CSI-RS configurations in CoMP measurement set |

TABLE 66

| Value of CCIF | Description |
|---|---|
| '0' | Aperiodic CSI report is triggered for all CSI-RS configurations in CoMP measurement set |
| '1' | Aperiodic additional CSI report (for DB) is triggered for all CSI-RS configurations in CoMP measurement set |

TABLE 67

| Value of CCIF | Description |
|---|---|
| '0' | Aperiodic CSI report is triggered for best-m CSI-RS configurations which are selected by UE |
| '1' | Aperiodic additional CSI report is triggered (for DB) for best-m CSI-RS configurations which are selected by UE |

Table 68 shows an example of a CSI-RS configuration indicator field (1 bit case) using an Aperiodic-CSI-RS-Configuration-Trigger, when an Additional CSI Request field for DB is set to 1. In addition to a CSI report for corresponding CSI-RS configurations, a CSI report for DB for corresponding CSI-RS configurations is triggered.

TABLE 68

| Value of CCIF | Description |
|---|---|
| '0' | Aperiodic CSI report is triggered for a $1^{st}$ set of CSI-RS Configurations configured by higher layers |

TABLE 68-continued

| Value of CCIF | Description |
|---|---|
| '1' | Aperiodic CSI report is triggered for a $2^{nd}$ set of CSI-RS Configurations configured by higher layers |

Tables 69 to 71 shows examples of a CSI-RS configuration indicator field (1 bit case) using an aperiodic-CSI-RS-Configuration-Trigger, when a A-CSI field does not exist.

TABLE 69

| Value of CCIF | Description |
|---|---|
| '0' | Aperiodic CSI report is triggered for a $1^{st}$ set of CSI-RS Configurations configured by higher layers |
| '1' | Aperiodic CSI report is triggered for a $1^{st}$ set of CSI-RS Configurations configured by higher layers, and aperiodic additional CSI report (for DB) is triggered for a 1-st set of CSI-RS Configurations configured by higher layers |

TABLE 70

| Value of CCIF | Description |
|---|---|
| '0' | Aperiodic CSI report is triggered for a $1^{st}$ set of CSI-RS Configurations configured by higher layers, and aperiodic additional CSI report (for DB) is triggered for a 1st set of CSI-RS Configurations configured by higher layers |
| '1' | Aperiodic CSI report is triggered for a $2^{nd}$ set of CSI-RS Configurations configured by higher layers, and aperiodic additional CSI report (for DB) is triggered for a 2nd set of CSI-RS Configurations configured by higher layers |

TABLE 71

| Value of CCIF | Description |
|---|---|
| '0' | Aperiodic CSI report is triggered for best-m CSI-RS configurations which are selected by UE |
| '1' | Aperiodic CSI report is triggered for a $1^{st}$ set of CSI-RS Configurations configured by higher layers, and aperiodic additional CSI report (for DB) is triggered for a 1st set of CSI-RS Configurations configured by higher layers |

Tables 72 to 76 show examples of a CSI-RS configuration indicator field (1 bit case) using an Aperiodic-CSI-RS-Configuration-Trigger, when an A-CSI field does not exist.

TABLE 72

| Value of CCIF | Description |
|---|---|
| '0' | Aperiodic CSI report is triggered for a $1^{st}$ set of CSI-RS Configurations configured by higher layers |
| '1' | Aperiodic additional CSI report (for DB) is triggered for a $1^{st}$ set of CSI-RS Configurations configured by higher layers |

TABLE 73

| Value of CCIF | Description |
|---|---|
| '0' | Aperiodic additional CSI report (for DB) is triggered for a $1^{st}$ set of CSI-RS Configurations configured by higher layers |

TABLE 73-continued

| Value of CCIF | Description |
|---|---|
| '1' | Aperiodic CSI report is triggered for a 1$^{st}$ set of CSI-RS Configurations configured by higher layers, and aperiodic additional CSI report (for DB) is triggered for a 1st set of CSI-RS Configurations configured by higher layers |

TABLE 74

| Value of CCIF | Description |
|---|---|
| '0' | Aperiodic additional CSI report (for DB) is triggered for all CSI-RS Configurations which are selected by UE |
| '1' | Aperiodic additional CSI report (for DB) is triggered for a 1st set of CSI-RS Configurations configured by higher layers |

TABLE 75

| Value of CCIF | Description |
|---|---|
| '0' | Aperiodic additional CSI report (for DB) is triggered for a 1st set of CSI-RS Configurations configured by higher layers |
| '1' | Aperiodic additional CSI report (for DB) is triggered for a 2nd set of CSI-RS Configurations configured by higher layers |

TABLE 76

| Value of CCIF | Description |
|---|---|
| '0' | Aperiodic CSI report is triggered for all CSI-RS configurations which are selected by UE |
| '1' | Aperiodic additional CSI report (for DB) is triggered for a 1$^{st}$ set of CSI-RS Configurations configured by higher layers, and aperiodic additional CSI report (for DB) is triggered for a 1$^{st}$ set of CSI-RS Configurations configured by higher layers |

Table 77 shows an example of a CSI-RS configuration indicator field (2 bits case) without RRC signaling, when an Additional CSI Request field for DB is set to 1. In addition to a CSI report for corresponding CSI-RS configurations, a CSI report for DB for corresponding CSI-RS configurations is triggered.

TABLE 77

| Value of CCIF | Description |
|---|---|
| '00' | Aperiodic CSI report is triggered for single CSI-RS configuration |
| '01' | Aperiodic CSI report is triggered for best-m CSI-RS configurations which are selected by UE |
| '10' | Aperiodic CSI report is triggered for best-m' CSI-RS configurations which are selected by UE |
| '11' | Aperiodic CSI report is triggered for all CSI-RS configurations in CoMP measurement set |

Table 78 shows an example of a CSI-RS configuration indicator field (2 bits case) without RRC signaling, when an A-CSI field does not exist.

TABLE 78

| Value of CCIF | Description |
|---|---|
| '00' | Aperiodic CSI report is triggered for single CSI-RS configuration |
| '01' | Aperiodic CSI report is triggered for single CSI-RS configuration, and Aperiodic additional CSI report (for DB) is triggered for single CSI-RS configuration |
| '10' | Aperiodic CSI report is triggered for all CSI-RS configurations in CoMP measurement set |
| '11' | Aperiodic CSI report is triggered for all CSI-RS configurations in CoMP measurement set, and Aperiodic additional CSI report (for DB) is triggered for all CSI-RS configurations in CoMP measurement set |

Table 79 shows an example of a CSI-RS configuration indicator field (2 bits case) using an Aperiodic-CSI-RS-Configuration-Trigger, when an Additional CSI Request field for DB is set to 1. In addition to a CSI report for corresponding CSI-RS configurations, a CSI report for DB for corresponding CSI-RS configurations is triggered.

TABLE 79

| Value of CCIF | Description |
|---|---|
| '00' | Aperiodic CSI report is triggered for single CSI-RS configuration |
| '01' | Aperiodic CSI report is triggered for all CSI-RS configurations in CoMP measurement set |
| '10' | Aperiodic CSI report is triggered for a 1$^{st}$ set of CSI-RS Configurations configured by higher layers |
| '11' | Aperiodic CSI report is triggered for a 2$^{nd}$ set of CSI-RS Configurations configured by higher layers |

Table 80 shows an example of a CSI-RS configuration indicator field (2 bits case) using an Aperiodic-CSI-RS-Configuration-Trigger, when an A-CSI field does not exist.

TABLE 80

| Value of CCIF | Description |
|---|---|
| '00' | Aperiodic CSI report is triggered for all CSI-RS configurations in CoMP measurement set |
| '01' | Aperiodic CSI report is triggered for all CSI-RS configurations in CoMP measurement set, and Aperiodic additional CSI report (for DB) is triggered for all CSI-RS configurations in CoMP measurement set |
| '10' | Aperiodic CSI report is triggered for a 1$^{st}$ set of CSI-RS Configurations configured by higher layers, and Aperiodic additional CSI report (for DB) is triggered for a 1st set of CSI-RS Configurations configured by higher layers |
| '11' | Aperiodic CSI report is triggered for a 2$^{nd}$ set of CSI-RS Configurations configured by higher layers, and Aperiodic additional CSI report (for DB) is triggered for a 2nd set of CSI-RS Configurations configured by higher layers |

If the CSI-RS configuration indicator field is a bit-map type without RRC signaling, the additional CSI Request field for DB is set to 1. In addition to a CSI report for corresponding CSI-RS configurations, a CSI report for DB for corresponding CSI-RS configurations is triggered. The Bit-map type has a predefined CSI-RS reporting set, e.g., 3 bits.

[CSIRS1,CSIRS2,CSIRS3]=[000]~[111]

The leftmost bit 0 in the bit string corresponds to the CSI-RS configuration with CSIRS_ Configuration_ Index=0, etc. Each bit has either a value 0, which means no aperiodic CSI report for corresponding CSI-RS configuration is triggered, or a value 1, which means the aperiodic CSI report for corresponding CSI-RS configuration is triggered. The CoMP measurement set size is less than or equal to 3 in this case. The bit map size can be configurable. The size of a CCIF can be configured by higher layer signaling.

The CIF can be used instead of adding a new CCIF. The CIF may be 3 bits as shown in Table 81. The CIF information from 000 to 100 is used for 5 CCs, and the CIF information from 101 to 111 is not dedicated. This un-defined (or un-dedicated) bit allocation can be used to feedback information for CoMP. Single CC transmission may be assumed when CoMP feedback is triggered. A CC for a PUSCH is pre-defined (e.g., a lowest ServCellIndex), or defined in higher layer signaling.

TABLE 81

| Value of CIF | Description |
| --- | --- |
| '000'~'100' | Legacy CIF |
| '101' | Aperiodic CSI report is triggered for best-m CSI-RS configurations which are selected by UE, and Aperiodic additional CSI report is triggered (for DB) for best-m CSI-RS configurations which are selected by UE |
| '110' | Aperiodic CSI report is triggered for all CSI-RS configurations in CoMP measurement set |
| '111' | Aperiodic CSI report is triggered for a $1^{st}$ set of CSI-RS Configurations configured by higher layers |

The optional A-CSI field may indicate that the periodic-CSI-RS-Configuration-Trigger information may include a CSI report for DB. The UE can always have CSI feedback and additional CSI feedback for DB for a corresponding CSI configuration, without a A-CSI field (e.g., this could be the baseline of CSI feedback for CoMP). The A-CSI Request field can be 1 bit. Once the A-CSI Request field is set to 1, then additional CSI feedbacks for DS/CB are generated on the top of a CSI report for a CSI-RS configuration.

The RRC signaling sends the optional aperiodic-CSI-RS-Configuration-Trigger field indicating for which CSI-RS configurations the aperiodic CSI report is triggered, when at least one CSI-RS configuration is configured. The optional aperiodic-CSI-RS-Configuration-Trigger field may include the carrier indicator information, which is scheduling a CC for a UL PUSCH.

Two different sets from RRC signaling are referred for CA and CoMP. One set is for the CA, and each CC is called a serving cell'. For example, the aperiodic CSI report is triggered for a 1st set of serving cells configured by higher layers.

Another set is for the CoMP, and a CSI feedback report for each TP for CoMP corresponds to the set of CSI-RS configurations in a CoMP measurement set. For example, the aperiodic CSI report is triggered for a 1st set of CSI-RS configurations (i.e., in CoMP measurement set) configured by higher layers. On the top of an aperiodic CSI report for multiple CSI-RS configurations, a UE generates a CSI report for DB based on corresponding CSI-RS configurations.

Figure 12:
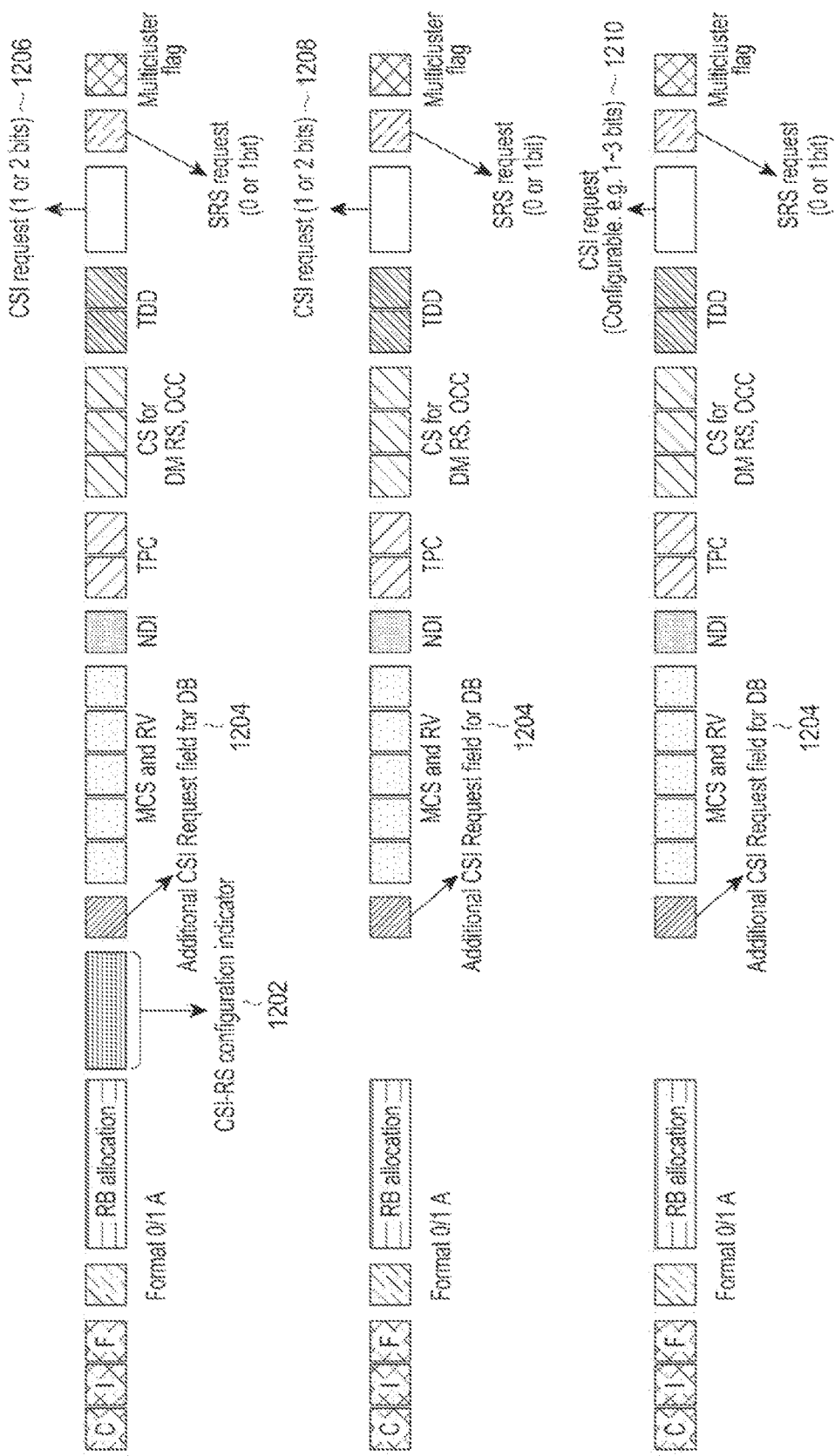

FIG. 12 illustrates an example of a DCI format according to an embodiment of the present invention.

Referring to FIG. 12, the DCI format includes a CIF, a Flag Format field, an RB allocation field, an optional CSI-RS configuration indicator (1202), an additional CSI request field for DB (1204), at least one MCS and RV field, an NDI, a TPC command, a CS for DMRS and an OCC index, a TDD configuration field for TDD only, a CSI request field (1206, 1208, 1210), an SRS request field, and a Multi-cluster flag. The CSI request field (1206, 1208, 1210) may be configurable to 1, 2, or 3 bits.

For feedback for JT, multiple CSI for all TPs are included in a feedback set. Connection CSI is established based on joint transmission. Possible connection information is as follows:
 Case 1: JT_RI (RI for JT), JT_PMI (PMI for JT), and JT_CQI (CQI for JT)
 Case 2: JT_PMI and JT_CQI
 Case 3: JT_CQI
 Case 4: JT_PMI JT_PMI is a phase difference information between TPs.

A JT set is a set of TPs (i.e., corresponding CSI-RS configurations) paired for JT. The JT set is subset of a CoMP measurement set. Multiple JT sets can be configured to one UE.

A new feedback mode for JT is also needed. A CSI may be included in a JT mode: (RI, PMI, CQI) for the each TP in JT set, (JT_RI, JT_PMI, JT_CQI) considering the joint transmission among TPs in JT set. The feedback of JT_RI might be optional. It can be deduced in an eNB side. JT_PMI is one or more phase differences among TPs in JT set. JT_CQI is the difference between a CQI for joint transmission and a CQI for the each TP.

For a CSI report for JT, an additional CSI report is calculated based on a JT assumption (or multiple TPs assumptions), which may be exampled in the above-described bullet points. For a CSI report for multiple points, the aperiodic CSI report is triggered for all CSI-RS configurations in a CoMP measurement set. For a CSI report for JT, the additional aperiodic CSI report (for JT) is triggered for all CSI-RS configurations in a CoMP measurement set.

The CSI Request Field may be configured by reusing a conventional CSI Request field with a modified description or increasing a size of a CSI Request Field to include feedback information for CoMP.

The optional A-CSI field may indicate that Aperiodic-CSI-RS-Configuration-Trigger information includes a CSI report for DB. The UE can always have a CSI feedback and an additional CSI feedback for JT for corresponding CSI configuration, without an A-CSI field (e.g., this could be the baseline of CSI feedback for CoMP). An A-CSI Request field can be 1 bit. Once the A-CSI Request field is set to 1, then additional CSI feedbacks for DS/CB are generated on top of a CSI report for a CSI-RS configuration.

The RRC signaling sends the CSI-RS-Configuration-Indicator-Presence field indicating whether or not an updated CSI Request field is used. The CSI-RS-Configuration-Indicator-Presence field indicates whether or not an A-CSI field is present. Otherwise, there may be a new RRC signaling of an 'A-CSI-Request-Presence' field for an A-CSI request field.

When a CSI-RS-Configuration-Indicator-Presence is disabled, an aperiodic CSI report based on the pre-defined CSI-RS configuration(s) can be triggered. For example, the aperiodic CSI report is triggered for all CSI-RS configurations in a CoMP measurement set, and an aperiodic additional CSI report (for JT) is triggered for all CSI-RS configurations in a CoMP measurement set.

Whether or not an updated CSI Request field is present for CoMP feedback can be dependent on at least one of (1) the number of non-zero-power CSI-RS resources configured by eNB, (2) the number of interference assumptions configured by eNB, and (3) the number of feedback configurations indicated by eNB, without the above-described RRC signaling a CSI-RS-Configuration-Indicator-Presence.

The optional Aperiodic-CSI-RS-Configuration-Trigger field indicates for which CSI-RS configurations the aperiodic CSI report is triggered, when at least one CSI-RS configuration is configured. The optional Aperiodic-CSI-RS-Configuration-Trigger field can be defined per each serving cell (or CC).

Two different sets from RRC signaling are referred for CA and CoMP. One set is for the CA, and each CC is called a serving cell. For example, the aperiodic CSI report is triggered for a 1st set of serving cells configured by higher layers.

Another set is for the CoMP, and a CSI feedback report for each TP for CoMP corresponds to the set of CSI-RS configurations in a CoMP measurement set. For example, an Aperiodic CSI report is triggered for a 1st set of CSI-RS configurations (i.e., in a CoMP measurement set) configured by higher layers.

A CoMP measurement set for an aperiodic CSI report can be different from a CoMP measurement set for a periodic CSI report.

Tables 82 to 85 show examples of new CSI request fields, when a conventional CSI Request field is 1 bit, the new CSI Request field is 1 bits, and an Additional CSI Request field for JT is set to 1. In addition to a CSI report for corresponding CSI-RS configurations, a CSI report for DB for corresponding CSI-RS configurations is triggered.

TABLE 82

| Value of CSI request field | Description |
| --- | --- |
| '0' | No aperiodic CSI report is triggered |
| '1' | Aperiodic CSI report is triggered for single CSI-RS configurations in CoMP measurement set |

TABLE 83

| Value of CSI request field | Description |
| --- | --- |
| '0' | No aperiodic CSI report is triggered |
| '1' | Aperiodic CSI report is triggered for best-m CSI-RS configurations in CoMP measurement set |

TABLE 84

| Value of CSI request field | Description |
| --- | --- |
| '0' | No aperiodic CSI report is triggered |
| '1' | Aperiodic CSI report is triggered for all CSI-RS configurations in CoMP measurement set |

TABLE 85

| Value of CSI request field | Description |
| --- | --- |
| '0' | No aperiodic CSI report is triggered |
| '1' | Aperiodic CSI report is triggered for a $1^{st}$ set of CSI-RS Configurations configured by higher layers |

Tables 86 to 89 show examples of new CSI Request fields, when a conventional CSI Request field is 1 bit, the new CSI Request field is 1 bit, and an A-CSI field does not exist.

TABLE 86

| Value of CSI request field | Description |
| --- | --- |
| '0' | No aperiodic CSI report is triggered |
| '1' | Aperiodic additional CSI report (for JT) is triggered for single CSI-RS configuration |

TABLE 87

| Value of CSI request field | Description |
| --- | --- |
| '0' | No aperiodic CSI report is triggered |
| '1' | Aperiodic CSI report is triggered for best-m CSI-RS configurations which are selected by UE, and aperiodic additional CSI report is triggered (for JT) for best-m CSI-RS configurations which are selected by UE |

TABLE 88

| Value of CSI request field | Description |
| --- | --- |
| '0' | No aperiodic CSI report is triggered |
| '1' | Aperiodic CSI report is triggered for all CSI-RS configurations in CoMP measurement set, and aperiodic additional CSI report (for JT) is triggered for all CSI-RS configurations in CoMP measurement set |

TABLE 89

| Value of CSI request field | Description |
| --- | --- |
| '0' | No aperiodic CSI report is triggered |
| '1' | Aperiodic CSI report is triggered for a $1^{st}$ set of CSI-RS Configurations configured by higher layers, and aperiodic additional CSI report (for JT) is triggered for a 1st set of CSI-RS Configurations configured by higher layers |

Tables 90 and 91 show examples of new CSI Request fields, when a conventional CSI Request field is 1 bit, the new CSI Request field is 2 bits, and an additional CSI Request field for JT is set to 1. In addition to a CSI report for corresponding CSI-RS configurations, a CSI report for JT for corresponding CSI-RS configurations is triggered.

TABLE 90

| Value of CSI request field | Description |
| --- | --- |
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE |
| '11' | Aperiodic CSI report is triggered for all CSI-RS configurations in CoMP measurement set |

TABLE 91

| Value of CSI request field | Description |
| --- | --- |
| '00' | No aperiodic CSI report is triggered |
| '01' | Aperiodic CSI report is triggered for single CSI-RS configuration |

TABLE 91-continued

| Value of CSI request field | Description |
|---|---|
| '10' | Aperiodic CSI report is triggered for best-m CSI-RS configurations which are selected by UE |
| '11' | Aperiodic CSI report is triggered for a $1^{st}$ set of CSI-RS Configurations configured by higher layers |

Tables 92 to 95 show examples of new CSI Request fields, when a conventional CSI Request field is 1 bit, the new CSI Request field is 2 bits, and an A-CSI field does not exist.

TABLE 92

| Value of CSI request field | Description |
|---|---|
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE, and aperiodic additional CSI report is triggered (for JT) for best-m CSI-RS configurations which are selected by UE |
| '11' | Aperiodic CSI report is triggered for all CSI-RS configurations in CoMP measurement set, and aperiodic additional CSI report (for JT) is triggered for all CSI-RS configurations in CoMP measurement set |

TABLE 93

| Value of CSI request field | Description |
|---|---|
| '00' | No aperiodic CSI report is triggered |
| '01' | Aperiodic CSI report is triggered for single CSI-RS configuration |
| '10' | Aperiodic CSI report is triggered for best-m CSI-RS configurations which are selected by UE, and aperiodic additional CSI report is triggered (for JT) for best-m CSI-RS configurations which are selected by UE |
| '11' | Aperiodic CSI report is triggered for a $1^{st}$ set of CSI-RS Configurations configured by higher layers, and aperiodic additional CSI report (for JT) is triggered for a 1st set of CSI-RS Configurations configured by higher layers |

TABLE 94

| Value of CSI request field | Description |
|---|---|
| '00' | No aperiodic CSI report is triggered |
| '01' | Aperiodic CSI report is triggered for all CSI-RS configurations in CoMP measurement set |
| '10' | Aperiodic additional CSI report (for JT) is triggered for all CSI-RS configurations in CoMP measurement set |
| '11' | Aperiodic CSI report is triggered for all CSI-RS configurations in CoMP measurement set, and aperiodic additional CSI report (for JT) is triggered for all CSI-RS configurations in CoMP measurement set |

TABLE 95

| Value of CSI request field | Description |
|---|---|
| '00' | No aperiodic CSI report is triggered |
| '01' | Aperiodic CSI report is triggered for a $1^{st}$ set of CSI-RS Configurations configured by higher layers |
| '10' | Aperiodic additional CSI report (for JT) is triggered for a $1^{st}$ set of CSI-RS Configurations configured by higher layers |
| '11' | Aperiodic CSI report is triggered for a $1^{st}$ set of CSI-RS Configurations configured by higher layers, and aperiodic additional CSI report (for JT) is triggered for a 1st set of CSI-RS Configurations configured by higher layers |

Tables 96 and 97 show examples of new CSI Request fields, when a conventional CSI Request field is 2 bits, the new CSI Request field is 2 bits, and an Additional CSI Request field for JT is set to 1. In addition to a CSI report for corresponding CSI-RS configurations, a CSI report for DB for corresponding CSI-RS configurations is triggered.

TABLE 96

| Value of CSI request field | Description |
|---|---|
| '00' | No aperiodic CSI report is triggered |
| '01' | Aperiodic CSI report is triggered for all CSI-RS configurations in CoMP measurement set for serving cell c |
| '10' | Aperiodic CSI report is triggered for a $1^{st}$ set of CSI-RS Configurations and a $1^{st}$ set of serving cells configured by higher layers |
| '11' | Aperiodic CSI report is triggered for a $2^{nd}$ set of CSI-RS Configurations and a $2^{nd}$ set of serving cells configured by higher layers |

TABLE 97

| Value of CSI request field | Description |
|---|---|
| '00' | No aperiodic CSI report is triggered |
| '01' | Aperiodic CSI report is triggered for best-m CSI-RS configurations in CoMP measurement set for serving cell c |
| '10' | Aperiodic CSI report is triggered for a $1^{st}$ set of CSI-RS Configurations and a $1^{st}$ set of serving cells configured by higher layers |
| '11' | Aperiodic CSI report is triggered for a $2^{nd}$ set of CSI-RS Configurations and a $2^{nd}$ set of serving cells configured by higher layers |

Tables 98 and 99 shows examples of new CSI Request fields, when a conventional CSI Request field is 2 bits, the new CSI Request field is 2 bits, and an A-CSI field does not exist.

TABLE 98

| Value of CSI request field | Description |
|---|---|
| '00' | No aperiodic CSI report is triggered |
| '01' | Aperiodic CSI report is triggered for all CSI-RS configurations in CoMP measurement set for serving cell c |
| '10' | Aperiodic CSI report is triggered for a $1^{st}$ set of CSI-RS Configurations and a $1^{st}$ set of serving cells configured by higher layers, and Aperiodic additional CSI report (for JT) is triggered for a 1st set of CSI-RS Configurations and a 1st set of serving cells configured by higher layers |
| '11' | Aperiodic CSI report is triggered for a $2^{nd}$ set of CSI-RS Configurations and a $2^{nd}$ set of serving cells configured by higher layers, and Aperiodic additional CSI report (for JT) is triggered for a 2nd set of CSI-RS Configurations and a 2nd set of serving cells configured by higher layers |

TABLE 99

| Value of CSI request field | Description |
| --- | --- |
| '00' | No aperiodic CSI report is triggered |
| '01' | Aperiodic CSI report is triggered for all CSI-RS configurations in CoMP measurement set for serving cell c |
| '10' | Aperiodic CSI report is triggered for a $1^{st}$ set of CSI-RS Configurations and a $1^{st}$ set of serving cells configured by higher layers |
| '11' | Aperiodic additional CSI report (for JT) is triggered for a $1^{st}$ set of CSI-RS Configurations and a $1^{st}$ set of serving cells configured by higher layers |

Table 100 shows an example of a new CSI Request field, when a conventional CSI Request field is 2 bits, the new CSI Request field is 3 bits, and an Additional CSI Request field for JT is set to 1. In addition to a CSI report for corresponding CSI-RS configurations, a CSI report for JT for corresponding CSI-RS configurations is triggered.

TABLE 100

| Value of CSI request field | Description |
| --- | --- |
| '000' | No aperiodic CSI report is triggered |
| '001' | Aperiodic CSI report is triggered for single CSI-RS configurations in CoMP measurement set for serving cell c |
| '010' | Aperiodic CSI report is triggered for single CSI-RS configurations and a $1^{st}$ set of serving cells configured by higher layers |
| '011' | Aperiodic CSI report is triggered for single CSI-RS configurations and a $2^{nd}$ set of serving cells configured by higher layers |
| '100' | Aperiodic CSI report is triggered for best-m CSI-RS configurations which are selected by UE for serving cell c |
| '101' | Aperiodic CSI report is triggered for all CSI-RS configurations in CoMP measurement set for serving cell c |
| '110' | Aperiodic CSI report is triggered for a $1^{st}$ set of CSI-RS Configurations and a $1^{st}$ set of serving cells configured by higher layers |
| '111' | Aperiodic CSI report is triggered for a $2^{nd}$ set of CSI-RS Configurations and a $2^{nd}$ set of serving cells configured by higher layers |

Tables 101 and 102 shows examples of new CSI Request fields, when a conventional CSI Request field is 2 bits, the new CSI Request field is 3 bits, and an A-CSI field does not exist.

TABLE 101

| Value of CSI request field | Description |
| --- | --- |
| '000' | No aperiodic CSI report is triggered |
| '001' | Aperiodic CSI report is triggered for single CSI-RS configurations in CoMP measurement set for serving cell c |
| '010' | Aperiodic CSI report is triggered for single CSI-RS configurations and a $1^{st}$ set of serving cells configured by higher layers |
| '011' | Aperiodic CSI report is triggered for single CSI-RS configurations and a $2^{nd}$ set of serving cells configured by higher layers |
| '100' | Aperiodic CSI report is triggered for all CSI-RS configurations in CoMP measurement set for serving cell c |
| '101' | Aperiodic additional CSI report (for JT) is triggered for all CSI-RS configurations in CoMP measurement set for serving cell c |
| '110' | Aperiodic CSI report is triggered for a $1^{st}$ set of CSI-RS Configurations and a $1^{st}$ set of serving cells configured |

TABLE 101-continued

| Value of CSI request field | Description |
| --- | --- |
| | by higher layers, and Aperiodic additional CSI report (for JT) is triggered for a 1st set of CSI-RS Configurations and a 1st set of serving cells configured by higher layers |
| '111' | Aperiodic CSI report is triggered for a $2^{nd}$ set of CSI-RS Configurations and a $2^{nd}$ set of serving cells configured by higher layers, and Aperiodic additional CSI report (for JT) is triggered for a 2nd set of CSI-RS Configurations and a 2nd set of serving cells configured by higher layers |

TABLE 102

| Value of CSI request field | Description |
| --- | --- |
| '000' | No aperiodic CSI report is triggered |
| '001' | Aperiodic CSI report is triggered for all CSI-RS configurations in CoMP measurement set for serving cell c |
| '010' | Aperiodic CSI report is triggered for all CSI-RS configurations and a $1^{st}$ set of serving cells configured by higher layers |
| '011' | Aperiodic CSI report is triggered for all CSI-RS configurations and a $2^{nd}$ set of serving cells configured by higher layers |
| '100' | Aperiodic CSI report is triggered for best-m CSI-RS configurations which are selected by UE for serving cell c |
| '101' | Aperiodic CSI report is triggered for all CSI-RS configurations in CoMP measurement set for serving cell c, and aperiodic additional CSI report (for JT) is triggered for all CSI-RS configurations in CoMP measurement set for serving cell c |
| '110' | Aperiodic CSI report is triggered for a $1^{st}$ set of CSI-RS Configurations and a $1^{st}$ set of serving cells configured by higher layers, and Aperiodic additional CSI report (for JT) is triggered for a 1st set of CSI-RS Configurations and a 1st set of serving cells configured by higher layers |
| '111' | Aperiodic CSI report is triggered for a $2^{nd}$ set of CSI-RS Configurations and a $2^{nd}$ set of serving cells configured by higher layers, and Aperiodic additional CSI report (for JT) is triggered for a 2nd set of CSI-RS Configurations and a 2nd set of serving cells configured by higher layers |

A description of the additional Field for Multiple CSI Reports for Multiple TPs and JT is provided below.

The new fields for multiple CSI reports for multiple TPs include a CSI-RS configuration indicator field (CCIF) and an Additional CSI Request field for JT (i.e., an A-CSI Request).

In a first optional embodiment, the CCIF indicates the aperiodic CSI report for a pre-defined CSI-RS configuration (or configurations). For example, the feedback for a CSI-RS configuration that has a lowest configuration index is indicated. As another example, the feedback for all CSI-RS configurations in a CoMP measurement set is indicated.

In a second optional embodiment, the CCIF indicates the aperiodic CSI report feedback is triggered for best-m CSI-RS configurations, which are selected by a UE. 'm' is an integer value from 1 to a size of a CoMP measurement set, which is configured by a higher layer.

In a third optional embodiment, the CCIF indicates the aperiodic CSI report is triggered for a pre-defined set of CSI-RS configurations configured by a higher layer. On top of an aperiodic CSI report for multiple CSI-RS configurations, a UE generates a CSI report for JT based on corresponding CSI-RS configurations, when an A-CSI Request is set to 1.

The A-CSI field may be an optional field that indicates whether or not the aperiodic-CSI-RS-Configuration-Trigger information includes a CSI report for JT. The UE can always have a CSI feedback and an additional CSI feedback for JT for a corresponding CSI configuration, without an A-CSI field (e.g., this could be the baseline of CSI feedback for CoMP). An A-CSI Request field can be 1 bit, and if set to 1, then additional CSI feedbacks for JT are generated based on a CCIF.

The RRC signaling sends the CSI-RS-Configuration-Indicator-Presence field indicating whether or not a CSI-RS configuration indicator field is present. The CSI-RS-Configuration-Indicator-Presence field may indicate whether or not an A-CSI field is present. Otherwise, there could be a new RRC signaling of an 'A-CSI-Request-Presence' field for an A-CSI request field.

When a CSI-RS-Configuration-Indicator-Presence is disabled, an aperiodic CSI report based on pre-defined CSI-RS configuration(s) can be triggered. For example, the aperiodic CSI report is triggered for all CSI-RS configurations in a CoMP measurement set, and an aperiodic additional CSI report (i.e., for JT) is triggered for all CSI-RS configurations in a CoMP measurement set.

Whether or not a CSI-RS configuration indicator field is present for CoMP feedback can be dependent on at least one of (1) the number of non-zero-power CSI-RS resources configured by eNB, (2) the number of interference assumptions configured by eNB, and (3) the number of feedback configurations indicated by eNB, without the above-described RRC signaling a CSI-RS-Configuration-Indicator-Presence.

The optional Aperiodic-CSI-RS-Configuration-Trigger field indicates for which CSI-RS configurations the aperiodic CSI report is triggered when at least one CSI-RS configuration is configured. The optional Aperiodic-CSI-RS-Configuration-Trigger field can be defined for each serving cell (or CC).

Two different sets from RRC signaling are referred for CA and CoMP. One set is for the CA, and each CC is called a serving cell. For example, the aperiodic CSI report is triggered for a 1st set of serving cells configured by higher layers.

Another set is for the CoMP, and a CSI feedback report for each TP for CoMP corresponds to the set of CSI-RS configurations in a CoMP measurement set. For example, the aperiodic CSI report is triggered for a 1st set of CSI-RS configurations (i.e., in a CoMP measurement set) configured by higher layers.

The CCIF and the A-CSI may not be used for a UL PUSCH scheduling (not for aperiodic CSI report). When CSI report request field is zero, a CCIF/A-CSI can be used for a different purpose, e.g., RRM (RSRP) measurement triggering. A CoMP measurement set for an aperiodic CSI report can be different from a CoMP measurement set for a periodic CSI report.

Table 103 shows an example of a CSI-RS configuration indicator field (1 bit case) without RRC signaling, when an additional CSI Request field for JT is set to 1. In addition to a CSI report for corresponding CSI-RS configurations, a CSI report for JT for corresponding CSI-RS configurations is triggered.

TABLE 103

| Value of CCIF | Description |
| --- | --- |
| '0' | Aperiodic CSI report is triggered for single CSI-RS configuration |
| '1' | Aperiodic CSI report is triggered for all CSI-RS configurations in CoMP measurement set |

Tables 104 to 106 show examples of CSI-RS configuration indicator fields (1 bit case) without RRC signaling, when an A-CSI field does not exist.

TABLE 104

| Value of CCIF | Description |
| --- | --- |
| '0' | Aperiodic CSI report is triggered for single CSI-RS configuration |
| '1' | Aperiodic CSI report is triggered for all CSI-RS configurations in CoMP measurement set, and aperiodic additional CSI report (for JT) is triggered for all CSI-RS configurations in CoMP measurement set |

TABLE 105

| Value of CCIF | Description |
| --- | --- |
| '0' | Aperiodic CSI report is triggered for all CSI-RS configurations in CoMP measurement set |
| '1' | Aperiodic CSI report is triggered for all CSI-RS configurations in CoMP measurement set, and aperiodic additional CSI report (for JT) is triggered for all CSI-RS configurations in CoMP measurement set |

TABLE 106

| Value of CCIF | Description |
| --- | --- |
| '0' | Aperiodic CSI report is triggered for best-m CSI-RS configurations which are selected by UE |
| '1' | Aperiodic CSI report is triggered for best-m CSI-RS configurations which are selected by UE, and aperiodic additional CSI report (for JT) is triggered for best-m CSI-RS configurations which are selected by UE |

Tables 107 to 109 show examples of CSI-RS configuration indicator fields (1 bit case) without RRC signaling, when an A-CSI field does not exist.

TABLE 107

| Value of CCIF | Description |
| --- | --- |
| '0' | Aperiodic additional CSI report (for JT) is triggered for all CSI-RS configurations in CoMP measurement set |
| '1' | Aperiodic CSI report is triggered for all CSI-RS configurations in CoMP measurement set, and aperiodic additional CSI report (for JT) is triggered for all CSI-RS configurations in CoMP measurement set |

TABLE 108

| Value of CCIF | Description |
| --- | --- |
| '0' | Aperiodic additional CSI report is triggered for all CSI-RS configurations in CoMP measurement set |
| '1' | Aperiodic additional CSI report (for JT) is triggered for all CSI-RS configurations in CoMP measurement set |

TABLE 109

| Value of CCIF | Description |
|---|---|
| '0' | Aperiodic additional CSI report is triggered for best-m CSI-RS configurations which are selected by UE |
| '1' | Aperiodic additional CSI report (for JT) is triggered for best-m CSI-RS configurations which are selected by UE |

Table 110 shows an example of a CSI-RS configuration indicator field (1 bit case) using an Aperiodic-CSI-RS-Configuration-Trigger, when an additional CSI Request field for JT is set to 1. In addition to a CSI report for corresponding CSI-RS configurations, a CSI report for JT for corresponding CSI-RS configurations is triggered.

TABLE 110

| Value of CCIF | Description |
|---|---|
| '0' | Aperiodic CSI report is triggered for a 1st set of CSI-RS configurations configured by higher layers |
| '1' | Aperiodic CSI report is triggered for a 2nd set of CSI-RS configurations configured by higher layers |

Tables 111 to 113 show examples of CSI-RS configuration indicator fields (1 bit case) using an Aperiodic-CSI-RS-Configuration-Trigger, when an A-CSI field does not exist.

TABLE 111

| Value of CCIF | Description |
|---|---|
| '0' | Aperiodic CSI report is triggered for a 1st set of CSI-RS configurations configured by higher layers |
| '1' | Aperiodic CSI report is triggered for a 1st set of CSI-RS configurations configured by higher layers, and aperiodic additional CSI report (for JT) is triggered for a 1st set of CSI-RS configurations configured by higher layers |

TABLE 112

| Value of CCIF | Description |
|---|---|
| '0' | Aperiodic CSI report is triggered for a 1st set of CSI-RS configurations configured by higher layers, and aperiodic additional CSI report (for JT) is triggered for a 1st set of CSI-RS configurations configured by higher layers |
| '1' | Aperiodic CSI report is triggered for a 2nd set of CSI-RS configurations configured by higher layers, and aperiodic additional CSI report (for JT) is triggered for a 2nd set of CSI-RS configurations configured by higher layers |

TABLE 113

| Value of CCIF | Description |
|---|---|
| '0' | Aperiodic CSI report is triggered for best-m CSI-RS configurations which are selected by UE |
| '1' | Aperiodic CSI report is triggered for a 1st set of CSI-RS configurations configured by higher layers, and aperiodic additional CSI report (for JT) is triggered for a 1st set of CSI-RS configurations configured by higher layers |

Tables 114 to 118 show examples of CSI-RS configuration indicator fields (1 bit case) using an Aperiodic-CSI-RS-Configuration-Trigger, when an A-CSI field does not exist.

TABLE 114

| Value of CCIF | Description |
|---|---|
| '0' | Aperiodic CSI report is triggered for a 1st set of CSI-RS configurations configured by higher layers |
| '1' | Aperiodic additional CSI report (for JT) is triggered for a 1st set of CSI-RS configurations configured by higher layers |

TABLE 115

| Value of CCIF | Description |
|---|---|
| '0' | Aperiodic additional CSI report (for JT) is triggered for a 1st set of CSI-RS configurations configured by higher layers |
| '1' | Aperiodic additional CSI report (for JT) is triggered for a 2nd set of CSI-RS configurations configured by higher layers |

TABLE 116

| Value of CCIF | Description |
|---|---|
| '0' | Aperiodic CSI report is triggered for all CSI-RS configurations which are selected by UE |
| '1' | Aperiodic CSI report is triggered for a 1st set of CSI-RS configurations configured by higher layers, and aperiodic additional CSI report (for JT) is triggered for a 1st set of CSI-RS configurations configured by higher layers |

TABLE 117

| Value of CCIF | Description |
|---|---|
| '0' | Aperiodic additional CSI report (for JT) is triggered for a 1st set of CSI-RS configurations configured by higher layers |
| '1' | Aperiodic CSI report is triggered for a 1st set of CSI-RS configurations configured by higher layers, and aperiodic additional CSI report (for JT) is triggered for a 1st set of CSI-RS configurations configured by higher layers |

TABLE 118

| Value of CCIF | Description |
|---|---|
| '0' | Aperiodic CSI report is triggered for all CSI-RS configurations which are selected by UE |
| '1' | Aperiodic additional CSI report (for JT) is triggered for a 1st set of CSI-RS configurations configured by higher layers |

Table 119 shows an example of a CSI-RS configuration indicator field (2 bits case) without RRC signaling, when an Additional CSI Request field for JT is set to 1. In addition to a CSI report for corresponding CSI-RS configurations, a CSI report for JT for corresponding CSI-RS configurations is triggered.

TABLE 119

| Value of CCIF | Description |
|---|---|
| '00' | Aperiodic CSI report is triggered for single CSI-RS configuration |
| '01' | Aperiodic CSI report is triggered for best-m CSI-RS configurations which are selected by UE |

TABLE 119-continued

| Value of CCIF | Description |
| --- | --- |
| '10' | Aperiodic CSI report is triggered for best-m' CSI-RS configurations which are selected by UE |
| '11' | Aperiodic CSI report is triggered for all CSI-RS configurations in CoMP measurement set |

Table 120 shows an example of a CSI-RS configuration indicator field (2 bits case) without RRC signaling, when an A-CSI field does not exist.

TABLE 120

| Value of CCIF | Description |
| --- | --- |
| '00' | Aperiodic CSI report is triggered for single CSI-RS configuration |
| '01' | Aperiodic CSI report is triggered for best-m CSI-RS configurations which are selected by UE, and Aperiodic additional CSI report is triggered (for JT) for best-m CSI-RS configurations which are selected by UE |
| '10' | Aperiodic CSI report is triggered for all CSI-RS configurations in CoMP measurement set |
| '11' | Aperiodic CSI report is triggered for all CSI-RS configurations in CoMP measurement set, and Aperiodic additional CSI report (for JT) is triggered for all CSI-RS configurations in CoMP measurement set |

Table 121 shows an example of a CSI-RS configuration indicator field (2 bits case) using an Aperiodic-CSI-RS-Configuration-Trigger, when an Additional CSI Request field for JT is set to 1. In addition to a CSI report for corresponding CSI-RS configurations, a CSI report for JT for corresponding CSI-RS configurations is triggered.

TABLE 121

| Value of CCIF | Description |
| --- | --- |
| '00' | Aperiodic CSI report is triggered for single CSI-RS configuration |
| '01' | Aperiodic CSI report is triggered for all CSI-RS configurations in CoMP measurement set |
| '10' | Aperiodic CSI report is triggered for a $1^{st}$ set of CSI-RS Configurations configured by higher layers |
| '11' | Aperiodic CSI report is triggered for a $2^{nd}$ set of CSI-RS Configurations configured by higher layers |

Table 122 shows an example of a CSI-RS configuration indicator field (2 bits case) using an Aperiodic-CSI-RS-Configuration-Trigger, when an A-CSI field does not exist.

TABLE 122

| Value of CCIF | Description |
| --- | --- |
| '00' | Aperiodic CSI report is triggered for all CSI-RS configurations in CoMP measurement set |
| '01' | Aperiodic CSI report is triggered for all CSI-RS configurations in CoMP measurement set, and Aperiodic additional CSI report (for JT) is triggered for all CSI-RS configurations in CoMP measurement set |
| '10' | Aperiodic CSI report is triggered for a $1^{st}$ set of CSI-RS Configurations configured by higher layers, and Aperiodic additional CSI report (for JT) is triggered for a 1st set of CSI-RS Configurations configured by higher layers |
| '11' | Aperiodic CSI report is triggered for a $2^{nd}$ set of CSI-RS Configurations configured by higher layers, and |

TABLE 122-continued

| Value of CCIF | Description |
| --- | --- |
| | Aperiodic additional CSI report (for JT) is triggered for a 2nd set of CSI-RS Configurations configured by higher layers |

The CSI-RS configuration indicator field may have a bit-map type without RRC signaling. When the additional CSI Request field for JT is set to 1, in addition to a CSI report for corresponding CSI-RS configurations, a CSI report for JT for corresponding CSI-RS configurations is triggered. The bit-map type is indicated by a predefined CSI-RS reporting set, e.g., 3 bits.

[CSIRS1,CSIRS2,CSIRS3]=[000]~[111]

The leftmost bit 0 in the bit string corresponds to the CSI-RS configuration with CSIRS_Configuration_Index=0, etc. Each bit has either a value 0, which means no aperiodic CSI report for a corresponding CSI-RS configuration is triggered, or a value 1, which means the aperiodic CSI report for a corresponding CSI-RS configuration is triggered.

The UE can feedback the CSI report for JT when multiple CSI-RS configuration bits are set.

[CSIRS1,CSIRS2,CSIRS3]=[011]

The UE can feedback a CSI report for CSIRS2 and a CSI report for CSIRS3, a CSI report for JT considering CSIRS2 and CSIRS3 are used for JT. The UE can always have a CSI feedback and an additional CSI feedback for JT for corresponding CSI configurations, without an A-CSI field (e.g., this could be the baseline of CSI feedback for CoMP). The CoMP measurement set size may be less than or equal to 3 in this case.

The bit map size can be configurable. For example, the size of a CCIF can be configured by higher layer signaling The Carrier Indicator Field (CIF) may be used instead of adding a new CCIF. The CIF is 3 bits as shown in Table 123. The CIF information from 000 to 100 (for 5 CCs) is used, and CIF information from 101 to 111 is not dedicated. This un-defined (or un-dedicated) bit allocation can be used to feedback information for CoMP. A single CC transmission may be assumed when CoMP feedback is triggered. A CC for a PUSCH is pre-defined (e.g., a lowest ServCellIndex), or defined in higher layer signaling.

TABLE 123

| Value of CIF | Description |
| --- | --- |
| '000'~'100' | Legacy CIF |
| '101' | Aperiodic CSI report is triggered for best-m CSI-RS configurations which are selected by UE, and Aperiodic additional CSI report is triggered (for JT) for best-m CSI-RS configurations which are selected by UE |
| '110' | Aperiodic CSI report is triggered for all CSI-RS configurations in CoMP measurement set |
| '111' | Aperiodic CSI report is triggered for a $1^{st}$ set of CSI-RS Configurations configured by higher layers |

The A-CSI may be an optional field to indicate whether or not the Aperiodic-CSI-RS-Configuration-Trigger information includes a CSI report for JT. The UE can always have a CSI feedback and an additional CSI feedback for JT for a corresponding CSI configuration, without an A-CSI field (e.g., this could be the baseline of a CSI feedback for CoMP). The A-CSI Request field can be 1 bit, and if set to 1, then additional CSI feedbacks for DS/CB are generated on top of a CSI report for a CSI-RS configuration.

Two different sets from RRC signaling are referred for CA and CoMP. One set is for the CA, and each CC is called a serving cell. For example, the aperiodic CSI report is triggered for a 1st set of serving cells configured by higher layers.

Another set is for the CoMP, and a CSI feedback report for each TP for CoMP corresponds to the set of CSI-RS configurations in a CoMP measurement set. For example, the aperiodic CSI report is triggered for a 1st set of CSI-RS configurations (i.e., in a CoMP measurement set) configured by higher layers.

The RRC signaling sends the optional Aperiodic-CSI-RS-Configuration-Trigger field indicating for which CSI-RS configurations the aperiodic CSI report is triggered when at least one CSI-RS configuration is configured. The optional Aperiodic-CSI-RS-Configuration-Trigger field can include the carrier indicator information, which is scheduling a CC for a UL PUSCH. On top of an aperiodic CSI report for multiple CSI-RS configurations, a UE generates a CSI report for JT based on corresponding CSI-RS configurations.

Figure 13:
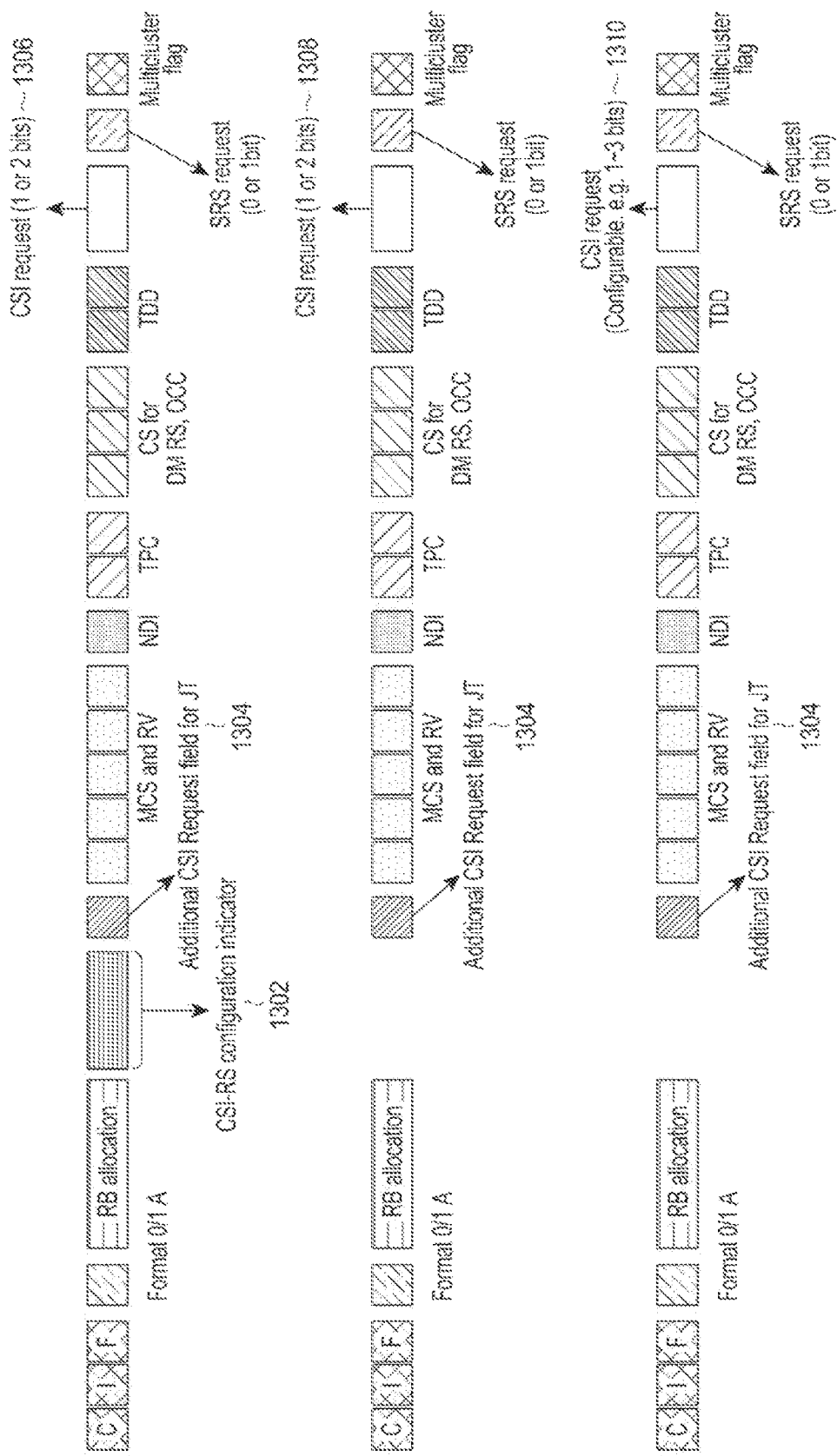

FIG. 13 illustrates an example of a DCI format according to an embodiment of the present invention.

Referring to FIG. 13, the DCI format includes a CIF, a Flag Format field, an RB allocation field, an optional CSI-RS configuration indicator (1302), an additional CSI request field for FT (1304), at least one MCS and RV field, an NDI, a TPC command, a CS for DMRS and an OCC index, a TDD configuration field for TDD only, a CSI request field (1306, 1308, 1310), an SRS request field, and a Multi-cluster flag. The CSI request field (1306, 1308, 1310) may configurable to 1, 2, or 3 bits.

The above-described embodiments of the present invention consider an aperiodic CSI report on a PUSCH for CoMP, and a CSI report for multiple CSI reports for multiple TPs, DS/DB, and JT. However, the combination of a CSI report for multiple CSI reports for multiple TPs, DS/DB, and JT is also possible.

Tables 124 and 125 show examples of a CSI request field.

TABLE 124

| Value of CSI request field | Description |
| --- | --- |
| '000' | No aperiodic CSI report is triggered |
| '001' | Aperiodic CSI report is triggered for all CSI-RS configurations in CoMP measurement set for serving cell c |
| '010' | Aperiodic CSI report is triggered for all CSI-RS configurations and a $1^{st}$ set of serving cells configured by higher layers |
| '011' | Aperiodic CSI report is triggered for all CSI-RS configurations and a $2^{nd}$ set of serving cells configured by higher layers |
| '100' | Aperiodic CSI report is triggered for a $1^{st}$ set of CSI-RS Configurations and a $1^{st}$ set of serving cells configured by higher layers, and Aperiodic additional CSI report (for DB) is triggered for a 1st set of CSI-RS Configurations and a 1st set of serving cells configured by higher layers |
| '101' | Aperiodic CSI report is triggered for a $2^{nd}$ set of CSI-RS Configurations and a $2^{nd}$ set of serving cells configured by higher layers, and Aperiodic additional CSI report (for DB) is triggered for a 2nd set of CSI-RS Configurations and a 2nd set of serving cells configured by higher layers |
| '110' | Aperiodic CSI report is triggered for a $1^{st}$ set of CSI-RS Configurations and a $1^{st}$ set of serving cells configured by higher layers, and Aperiodic additional CSI report (for JT) is triggered for a 1st set of CSI-RS Configurations and a 1st set of serving cells configured by higher layers |

TABLE 124-continued

| Value of CSI request field | Description |
| --- | --- |
| '111' | Aperiodic CSI report is triggered for a $2^{nd}$ set of CSI-RS Configurations and a $2^{nd}$ set of serving cells configured by higher layers, and Aperiodic additional CSI report (for JT) is triggered for a 2nd set of CSI-RS Configurations and a 2nd set of serving cells configured by higher layers |

TABLE 125

| Value of CSI request field | Description |
| --- | --- |
| '000' | No aperiodic CSI report is triggered |
| '001' | Aperiodic CSI report is triggered for all CSI-RS configurations in CoMP measurement set for serving cell c |
| '010' | Aperiodic CSI report is triggered for all CSI-RS configurations and a $1^{st}$ set of serving cells configured by higher layers |
| '011' | Aperiodic CSI report is triggered for all CSI-RS configurations and a $2^{nd}$ set of serving cells configured by higher layers |
| '100' | Aperiodic CSI report is triggered for all CSI-RS configurations in CoMP measurement set for serving cell c, and aperiodic additional CSI report (for DB) is triggered for all CSI-RS configurations in CoMP measurement set for serving cell c |
| '101' | Aperiodic CSI report is triggered for all CSI-RS configurations in CoMP measurement set for serving cell c, and aperiodic additional CSI report (for JT) is triggered for all CSI-RS configurations in CoMP measurement set for serving cell c |
| '110' | Aperiodic CSI report is triggered for a $1^{st}$ set of CSI-RS Configurations and a $1^{st}$ set of serving cells configured by higher layers, and Aperiodic additional CSI report (for DB) is triggered for a 1st set of CSI-RS Configurations and a 1st set of serving cells configured by higher layers |
| '111' | Aperiodic CSI report is triggered for a $1^{st}$ set of CSI-RS Configurations and a $1^{st}$ set of serving cells configured by higher layers, and Aperiodic additional CSI report (for JT) is triggered for a 1st set of CSI-RS Configurations and a 1st set of serving cells configured by higher layers |

The above-described methods for a CSI report for a CoMP transmission can be applied to a current DCI format of 0 or 4, and can also be included to a new DCI format for CoMP or other transmissions.

Figure 14:
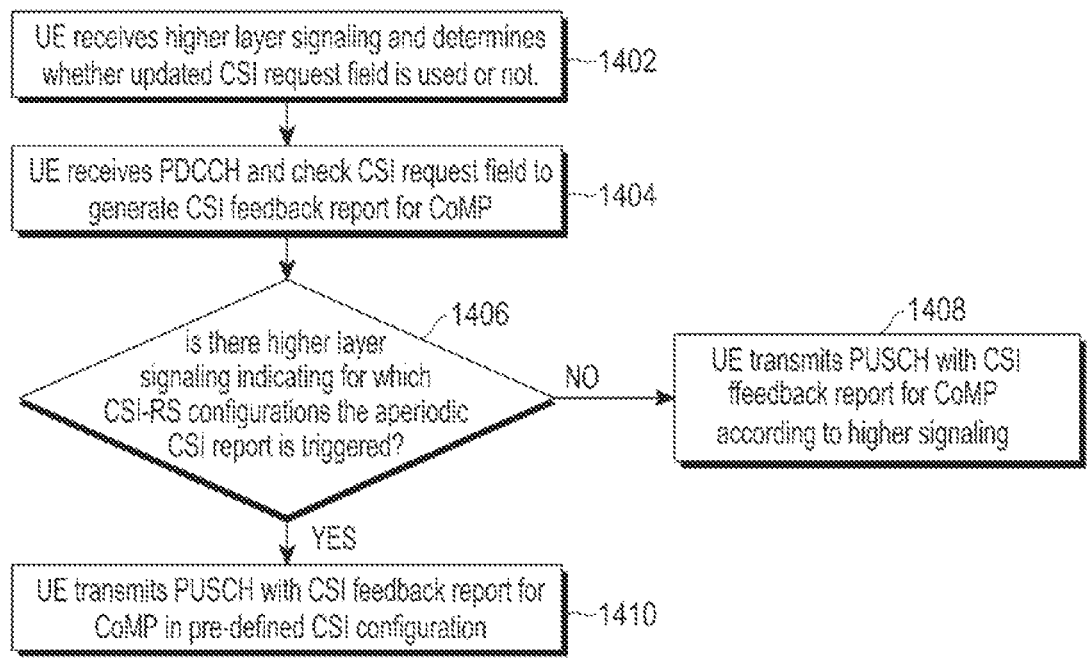
FIG. 14 is a flowchart illustrating a method of a UE that is requested to perform CSI feedback for CoMP, according to an embodiment of the present invention.

FIG. 14 is a flowchart illustrating a method of a UE that is requested to perform CSI feedback for CoMP, according to an embodiment of the present invention.

Referring to FIG. 14, a UE receives a higher layer signaling indicating whether CSI report includes CSI feedback information for CoMP transmission in step 1402. The UE receives a PDCCH and checks whether the PDCCH includes a CSI Request field and whether those bits are set for a UE to feedback CSI information in step 1404. The UE then examines whether there is higher layer signaling that indicates the kinds of CSI reporting (i.e., feedback allocation) for CoMP are requested to the UE in step 1406. If there is higher layer signaling indicating for which CSI-RS configurations the aperiodic CSI report is triggered, then the UE transmits a PUSCH with a CSI feedback report for CoMP, according to the higher signaling in step 1410. If there is no higher layer signaling indicating for which CSI-RS configurations the aperiodic CSI report is triggered, the UE transmits the PUSCH with a CSI feedback report for CoMP in a pre-defined CSI configuration in step 1408.

Figure 15:
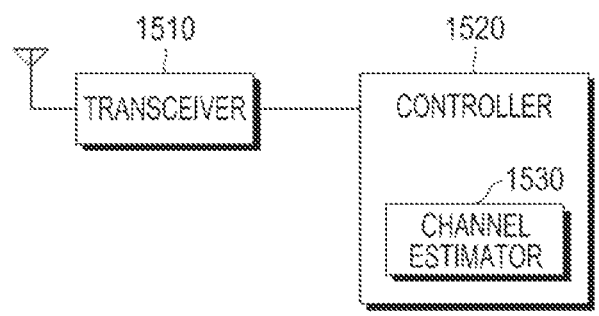
FIG. 15 is a block diagram illustrating a UE according to an embodiment of the present invention.

FIG. 15 is a block diagram illustrating a UE according to an embodiment of the present invention.

Referring to FIG. 15, the UE includes a transceiver 1510 and a controller 1520. The transceiver 1510 transmits and receives data to and from an outside device, e.g., a Node B. Herein, the transceiver 1510 wirelessly communicates with a central control device under control of the controller 1520 to receive DCI including an aperiodic feedback indicator and transmits channel information for a CoMP to the central control device.

The controller 1520 controls states and operations of all components of the UE. Herein, the controller 1520 selects feedback information for cooperative communication based on information shared between the UE and cells, and sends feedback information about a selected cell to the central control device. Accordingly, the controller 1520 includes a channel estimator 1530, which determines feedback information from at least one measurement set and interference related information received from the central control device, and estimates signal-and-interference by using a received CSI-RS and an IMR. The channel estimator 1530 controls the transceiver 1510 to send feedback information related to CoMP to the central control device.

Herein, the UE is described as including the transceiver 1510 and the controller 1520, but components of the UE are not limited thereto. That is, the UE may further include various components according to functions performed in the UE, e.g., a display, an input device, etc.

Figure 16:
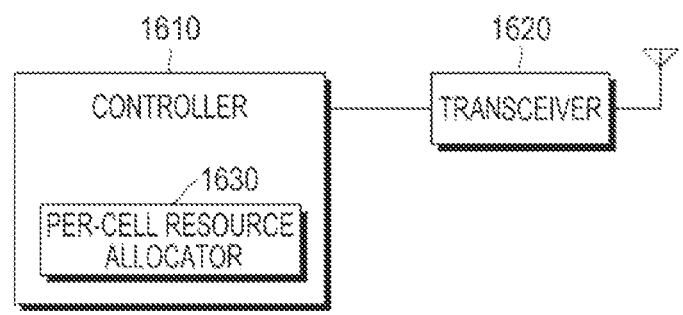
FIG. 16 is a block diagram illustrating a central control device according to an embodiment of the present invention.

FIG. 16 is a block diagram illustrating a central control device according to an embodiment of the present invention. Herein, the central control device may be implemented with a Node B or a separate network entity.

Referring to FIG. 16, the central control device includes a controller 1610 and a transceiver 1620. The controller 1610 controls states and operations of all components of the central control device. Herein, the controller 1610 allocates a CSI-RS and an IMR for cell for channel estimation of a UE to respective resources, and sets an aperiodic feedback indicator. Accordingly, the controller 1610 includes a resource allocator 1630, which allocates a CSI-RS to resources to allow the UE to estimate a channel for each cell, and transmits the CSI-RS by using the allocated resources. The resources allocated for each cell are allocated to correspond to a CSI-RS for channel estimation of each cell. The resource allocator 1630 also configures a proper IMR for each UE to properly reflect interference through the IMR.

The transceiver 1620 transmits and receives data to and from the UE or a cell managed by the central control device. Herein, the transceiver 1620 transmits a CSI-RS and an IMR to the UE through resources allocated under control of the controller 1610, transmits DCI including an aperiodic feedback indicator, and receives at least one feedback regarding channel information from the UE.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A feedback method for a user equipment (UE) in a communication system, the feedback method comprising:
    receiving, by the UE, information configuring one or more feedback allocations to the UE, via radio resource control (RRC) signaling;
    identifying a size of a channel status information (CSI) request field based on a number of the one or more feedback allocations identified based on the received information, and a type of a search space for downlink control information (DCI);
    receiving the DCI including the CSI request field having the identified size of the CSI request field on a physical downlink control channel (PDCCH) in the type of the search space; and
    triggering at least one aperiodic CSI report for at least one feedback allocation indicated by the CSI request field, wherein the at least one feedback allocation is included in the one or more feedback allocations,
    wherein each of the one or more feedback allocations is associated with one or more CSI reference signal (CSI-RS) resources and one or more CSI interference measurement (CSI-IM) resources.

2. The feedback method of claim 1, wherein
    the size of the CSI request field is determined to be 2 bits, in response to the number of the one or more feedback allocations being more than one and the DCI is received in a UE-specific search space.

3. The feedback method of claim 1, wherein the size of the CSI request field is determined to be 2 bits, in response to the number of the one or more feedback allocations being more than one.

4. The feedback method of claim 1, wherein the CSI request field is set to one of:
    a first value indicating that aperiodic feedback is triggered for a first set of at least one feedback allocation from among the one or more feedback allocations; and
    a second value indicating that aperiodic feedback is triggered for a second set of at least one feedback allocation from among the one or more feedback allocations.

5. The feedback method of claim 1, wherein the aperiodic CSI report corresponds to at least one downlink (DL) component carrier (CC) in which the DCI is transmitted, in case of a carrier aggregation (CA).

6. A feedback method in a communication system, the feedback method comprising:
    transmitting, to a user equipment (UE), information configuring one or more feedback allocations to the UE, via radio resource control (RRC) signaling;
    identifying a size of a channel status information (CSI) request field, based on a number of the one or more feedback allocations configured to the UE, and a type of a search space for downlink control information (DCI);
    transmitting, to the UE, the DCI including the CSI request field having the identified size of the CSI request field on a physical downlink control channel (PDCCH) in the type of the search space; and
    receiving, from the UE, at least one aperiodic CSI report for at least one feedback allocation indicated by the CSI request field, wherein the at least one feedback allocation is included in the one or more feedback allocations,
    wherein each of the one or more feedback allocations is associated with one or more CSI reference signal (CSI-RS) resources and one or more CSI interference measurement (CSI-IM) resources.

7. The feedback method of claim 6, wherein
    the size of the CSI request field is determined to be 2 bits, in response to the number of the one or more feedback allocations being more than one and the DCI is received in a UE-specific search space.

8. The feedback method of claim 6, wherein the size of the CSI request field is determined to be 2 bits, in response to the number of the one or more feedback allocations being more than one.

9. The feedback method of claim 6, wherein the CSI request field is set to one of:

a first value indicating that aperiodic feedback is triggered for a first set of at least one feedback allocation from among the one or more feedback allocations; and a second value indicating that aperiodic feedback is triggered for a second set of at least one feedback allocation from among the one or more feedback allocations.

10. The feedback method of claim 6, wherein the at least one CSI report corresponds to at least one downlink (DL) component carrier (CC) in which the DCI is transmitted, in case of a carrier aggregation (CA).

11. A user equipment (UE) device for performing feedback in a communication system, the UE device comprising:

a transceiver configured to receive information configuring one or more feedback allocations to the UE, via radio resource control (RRC) signaling, and receive downlink control information (DCI) including a channel status information (CSI) request field; and a controller configured to identify a size of the CSI request field based on a number of the one or more feedback allocations identified based on the received information, and a type of a search space for the DCI, and to trigger at least one aperiodic CSI report for at least one feedback allocation indicated by the CSI request field, wherein the at least one feedback allocation is included in the one or more feedback allocations, wherein each of the one or more feedback allocations is associated with one or more CSI reference signal (CSI-RS) resources and one or more CSI interference measurement (CSI-IM) resources.

12. The UE device of claim 11, wherein the size of the CSI request field is determined to be 2 bits, in response to the number of the one or more feedback allocations being more than one and the DCI is received in a UE-specific search space.

13. The UE device of claim 11, wherein the size of the CSI request field is determined to be 2 bits, in response to the number of the one or more feedback allocations being more than one.

14. The UE device of claim 11, wherein the CSI request field is set to one of:

a first value indicating that aperiodic feedback is triggered for a first set of at least one feedback allocation from among the one or more feedback allocations; and a second value indicating that aperiodic feedback is triggered for a second set of at least one feedback allocation from among the one or more feedback allocations.

15. The UE device of claim 11, wherein the aperiodic CSI report corresponds to at least one downlink (DL) component carrier (CC) in which the DCI is transmitted, in case of a carrier aggregation (CA).

16. A network device for performing feedback in a communication system, the network device comprising:

a transceiver configured to transmit, to a user equipment (UE), information configuring one or more feedback allocations to the UE, via radio resource control (RRC) signaling, and transmit downlink control information (DCI) including a channel status information (CSI) request field; and a controller configured to identify a size of the CSI request field, based on a number of the one or more feedback allocations configured to the UE and a type of a search space for the DCI, wherein the transceiver is further configured to receive at least one aperiodic CSI report for at least one feedback allocation indicated by the CSI request field, wherein the at least one feedback allocation is included in the one or more feedback allocations, and wherein each of the one or more feedback allocations is associated with one or more CSI reference signal (CSI-RS) resources and one or more CSI interference measurement (CSI-IM) resources.

17. The network device of claim 16, wherein the size of the CSI request field is determined to be 2 bits, in response to the number of the one or more feedback allocations being more than one and the DCI is received in a UE-specific search space.

18. The network device of claim 16, wherein the size of the CSI request field is determined to be 2 bits, in response to the number of the one or more feedback allocations being more than one.

19. The network device of claim 16, wherein the CSI request field is set to one of:

a first value indicating that aperiodic feedback is triggered for a first set of at least one feedback allocation from among the one or more feedback allocations; and a second value indicating that aperiodic feedback is triggered for a second set of at least one feedback allocation from among the one or more feedback allocations.

20. The network device of claim 16, wherein the aperiodic CSI report corresponds to at least one downlink (DL) component carrier (CC) in which the DCI is transmitted, in case of a carrier aggregation (CA).

* * * * *